US011653386B2

(12) United States Patent
Xue et al.

(10) Patent No.: US 11,653,386 B2
(45) Date of Patent: May 16, 2023

(54) INDICATION OF LISTEN-BEFORE-TALK CONFIGURATION FOR UPLINK COMMUNICATIONS

(71) Applicant: QUALCOMM Incorporated, San Diego, CA (US)

(72) Inventors: Yisheng Xue, San Diego, CA (US); Aleksandar Damnjanovic, Del Mar, CA (US); Xiaoxia Zhang, San Diego, CA (US); Jing Sun, San Diego, CA (US); Chih-Hao Liu, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 17/012,250

(22) Filed: Sep. 4, 2020

(65) Prior Publication Data
US 2021/0076421 A1  Mar. 11, 2021

Related U.S. Application Data

(60) Provisional application No. 62/898,359, filed on Sep. 10, 2019.

(51) Int. Cl.
*H04W 74/08* (2009.01)
*H04W 74/00* (2009.01)
*H04W 16/14* (2009.01)

(52) U.S. Cl.
CPC ....... *H04W 74/0816* (2013.01); *H04W 16/14* (2013.01); *H04W 74/006* (2013.01)

(58) Field of Classification Search
CPC . H04W 74/00; H04W 74/002; H04W 74/004; H04W 74/006; H04W 16/00;
(Continued)

(56) References Cited

U.S. PATENT DOCUMENTS

2016/0007368 A1 * 1/2016 Moon .................. H04W 56/00
370/329
2017/0196020 A1 * 7/2017 Mukherjee .......... H04W 74/004
(Continued)

FOREIGN PATENT DOCUMENTS

WO   WO2019195465   * 10/2019 ............ H04W 74/08

OTHER PUBLICATIONS

International Search Report and Written Opinion—PCT/US2020/049663—ISA/EPO—dated Nov. 5, 2020.

*Primary Examiner* — Warner Wong
(74) *Attorney, Agent, or Firm* — Qualcomm Incorporated

(57) ABSTRACT

Methods, systems, and devices for wireless communications are described. A user equipment may monitor for a transmission over a set of periodically scheduled resources (e.g., semi-persistently scheduled resources)) of a downlink shared channel in an unlicensed spectrum. The user equipment may receive the transmission, where the transmission indicates a channel access configuration (e.g., a listen-before-talk configuration) for accessing the unlicensed spectrum. In some cases, the transmission may include a medium access control (MAC) control element (MAC-CE) that indicates the channel access configuration. The transmission may additionally indicate at least one uplink channel over which the user equipment may transmit a message and/or a channel occupancy time associated with a successful acquisition of the unlicensed spectrum by the base station. The user equipment may transmit a message (e.g., an acknowledgement) based on the channel access configuration.

30 Claims, 18 Drawing Sheets

(58) Field of Classification Search
CPC ....... H04W 16/14; H04W 4/50; H04W 28/00; H04W 28/16; H04W 72/00; H04W 72/02; H04W 72/0406; H04W 72/0143; H04W 72/042; H04W 72/0446; H04W 72/1205; H04W 72/1278; H04W 74/0866; H04W 74/0891

See application file for complete search history.

(56) References Cited

U.S. PATENT DOCUMENTS

| | | | |
|---|---|---|---|
| 2018/0048498 A1* | 2/2018 | Stern-Berkowitz | H04L 5/0048 |
| 2018/0124749 A1* | 5/2018 | Park | H04W 74/08 |
| 2018/0192442 A1* | 7/2018 | Li | H04L 5/0048 |
| 2019/0037582 A1 | 1/2019 | Noh et al. | |
| 2019/0037600 A1 | 1/2019 | Urabayashi | |
| 2019/0075581 A1* | 3/2019 | Salem | H04W 74/006 |
| 2019/0141744 A1* | 5/2019 | Naghshvar | H04B 7/0452 |
| 2019/0150196 A1* | 5/2019 | Koorapaty | H04W 72/0446 370/329 |
| 2019/0313451 A1* | 10/2019 | Liu | H04W 72/042 |
| 2019/0349976 A1* | 11/2019 | Rudolf | H04W 72/1273 |
| 2019/0356446 A1* | 11/2019 | Kim | H04L 5/0094 |
| 2020/0022174 A1* | 1/2020 | Karaki | H04L 1/1812 |
| 2020/0119894 A1* | 4/2020 | Jia | H04L 5/00 |
| 2020/0137780 A1* | 4/2020 | Kim | H04L 5/0051 |
| 2020/0275490 A1* | 8/2020 | Li | H04W 74/0833 |
| 2020/0314896 A1* | 10/2020 | Koorapaty | H04W 72/042 |
| 2021/0185730 A1* | 6/2021 | Xue | H04W 72/0453 |
| 2021/0344451 A1* | 11/2021 | Hedayat | H04L 1/1819 |
| 2021/0352723 A1* | 11/2021 | Ye | H04W 74/008 |
| 2021/0352724 A1* | 11/2021 | Park | H04W 16/14 |
| 2021/0368541 A1* | 11/2021 | Hedayat | H04W 72/0446 |
| 2022/0304076 A1* | 9/2022 | Wang | H04W 74/0866 |

* cited by examiner

INDICATION OF LISTEN-BEFORE-TALK CONFIGURATION FOR UPLINK COMMUNICATIONS

CROSS REFERENCE

The present Application for Patent claims the benefit of U.S. Provisional Patent Application No. 62/898,359 by XUE et al., entitled "INDICATION OF LISTEN-BEFORE-TALK CONFIGURATION FOR UPLINK COMMUNICATIONS," filed Sep. 10, 2019, assigned to the assignee hereof, and expressly incorporated by reference herein.

BACKGROUND

The following relates generally to wireless communications, and more specifically to indication of listen-before-talk configuration for uplink communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a downlink control channel may be used to schedule downlink and uplink grants for a user equipment (UE). The downlink control channel may be transmitted according to search space sets, and may be monitored by the UE continuously while in a connected or active state. For example, UEs may monitor the control channel by decoding control channel candidates within the search space across one or more aggregation levels. Reduced capabilities for the UEs may result in an increase in aggregation level or decoding candidates, which may result in an undesirable amount of overhead and/or power consumption for the UEs.

SUMMARY

The present disclosure relates to methods, systems, devices, and apparatuses that support indication of listen-before-talk configuration for uplink communications. Generally, the described techniques provide for a user equipment (UE) to monitor for a transmission over a set of periodically scheduled resources of a downlink shared channel in an unlicensed spectrum. The UE may receive the transmission, where the transmission indicates a channel access configuration (e.g., a listen-before-talk (LBT) configuration) for accessing the unlicensed spectrum. In some cases, the transmission may include a medium access control (MAC) control element (MAC-CE) that indicates the channel access configuration. The transmission may additionally indicate at least one uplink channel over which the UE may transmit a message and/or a channel occupancy time (COT) associated with a successful acquisition of the unlicensed spectrum by the base station. The UE may transmit a message (e.g., an acknowledgement (ACK)) based on the channel access configuration.

A method for wireless communication at a UE is described. The method may include monitoring for a transmission over a set of periodically scheduled resources of a downlink shared channel in an unlicensed spectrum, receiving the transmission, where the transmission indicates a channel access configuration for the UE for accessing the unlicensed spectrum, and transmitting a message based on the channel access configuration.

An apparatus for wireless communication at a UE is described. The apparatus may include a processor, memory in electronic communication with the processor, and instructions stored in the memory. The instructions may be executable by the processor to cause the apparatus to monitor for a transmission over a set of periodically scheduled resources of a downlink shared channel in an unlicensed spectrum, receive the transmission, where the transmission indicates a channel access configuration for the UE for accessing the unlicensed spectrum, and transmit a message based on the channel access configuration.

Another apparatus for wireless communication at a UE is described. The apparatus may include means for monitoring for a transmission over a set of periodically scheduled resources of a downlink shared channel in an unlicensed spectrum, means for receiving the transmission, where the transmission indicates a channel access configuration for the UE for accessing the unlicensed spectrum, and means for transmitting a message based on the channel access configuration.

A non-transitory computer-readable medium storing code for wireless communication at a UE is described. The code may include instructions executable by a processor to monitor for a transmission over a set of periodically scheduled resources of a downlink shared channel in an unlicensed spectrum, receive the transmission, where the transmission indicates a channel access configuration for the UE for accessing the unlicensed spectrum, and transmit a message based on the channel access configuration.

In some aspects of the method, apparatuses, and non-transitory computer-readable medium described herein, the transmission includes a control element that indicates the channel access configuration.

In some aspects of the method, apparatuses, and non-transitory computer-readable medium described herein, the message includes an acknowledgement message associated with the transmission.

In some aspects of the method, apparatuses, and non-transitory computer-readable medium described herein, the control element indicates at least one uplink channel for transmitting the acknowledgement message.

In some aspects of the method, apparatuses, and non-transitory computer-readable medium described herein, the at least one uplink channel includes an uplink control channel, a configured-grant uplink shared channel, a random access channel, or a combination thereof.

In some aspects of the method, apparatuses, and non-transitory computer-readable medium described herein, the at least one uplink channel may include operations, features, means, or instructions for transmitting a pre-assigned preamble to a base station based on the at least one uplink channel including the random access channel.

In some aspects of the method, apparatuses, and non-transitory computer-readable medium described herein, the at least one uplink channel may include operations, features, means, or instructions for selecting one uplink channel of the two or more uplink channels for transmitting the acknowledgement message.

In some aspects of the method, apparatuses, and non-transitory computer-readable medium described herein, the at least one uplink channel may include operations, features, means, or instructions for transmitting copies of the acknowledgement message over at least two of the two or more uplink channels.

In some aspects of the method, apparatuses, and non-transitory computer-readable medium described herein, the transmission further includes data for the UE.

Some examples of the method, apparatuses, and non-transitory computer-readable medium described herein may further include operations, features, means, or instructions for receiving a second transmission, where the second transmission includes a second control element and a copy of the data for the UE.

Some examples of the method, apparatuses, and non-transitory computer-readable medium described herein may further include operations, features, means, or instructions for performing a channel access procedure on the unlicensed spectrum, identifying a COT associated with a successful acquisition of the unlicensed spectrum for performing communications based on the channel access procedure, transmitting a request for a second transmission to a base station, and receiving the second transmission from the base station during the COT.

Some examples of the method, apparatuses, and non-transitory computer-readable medium described herein may further include operations, features, means, or instructions for receiving a third transmission from a second base station during the COT.

In some aspects of the method, apparatuses, and non-transitory computer-readable medium described herein, the second transmission may be received at least partially over resources outside of the set of periodically scheduled resources.

In some aspects of the method, apparatuses, and non-transitory computer-readable medium described herein, the second transmission includes a second control element.

In some aspects of the method, apparatuses, and non-transitory computer-readable medium described herein, the channel access procedure includes a listen-before-talk procedure with random back off for acquiring a configured-grant uplink channel.

In some aspects of the method, apparatuses, and non-transitory computer-readable medium described herein, each of the set of periodically scheduled resources may include operations, features, means, or instructions for receiving the transmission over a first transmission time interval (TTI) of a set of TTIs of a periodically scheduled resource, identifying, from the control element, an indication to continue monitoring for one or more additional transmissions over additional TTIs of the set of TTIs, and continuing to monitor for the one or more additional transmissions over the additional TTIs of the set of TTIs after identifying the indication to continue the monitoring.

Some examples of the method, apparatuses, and non-transitory computer-readable medium described herein may further include operations, features, means, or instructions for transmitting the message based on the indicated COT.

Some examples of the method, apparatuses, and non-transitory computer-readable medium described herein may further include operations, features, means, or instructions for transmitting the message occurs before an end of the indicated COT.

In some aspects of the method, apparatuses, and non-transitory computer-readable medium described herein, the channel access configuration indicates a one-shot channel access configuration, and where the message may be transmitted before the end of the indicated COT based on the channel access configuration indicating the one-shot channel access configuration.

Some examples of the method, apparatuses, and non-transitory computer-readable medium described herein may further include operations, features, means, or instructions for receiving a second transmission, where the second transmission includes a second control element that indicates a downlink feedback indication (DFI).

In some aspects of the method, apparatuses, and non-transitory computer-readable medium described herein, the second transmission further includes data for the UE.

In some aspects of the method, apparatuses, and non-transitory computer-readable medium described herein, the control element includes an indication of downlink shared channel transmission to message timing, an uplink control channel resource indicator, a configured-grant uplink shared channel indicator, a preamble index for a random access channel, an indication of an end of a COT, or a combination thereof.

In some aspects of the method, apparatuses, and non-transitory computer-readable medium described herein, the control element may be a MAC-CE.

Some examples of the method, apparatuses, and non-transitory computer-readable medium described herein may further include operations, features, means, or instructions for receiving a second transmission, where the second transmission includes data for the UE and does not include an indication of a second channel access configuration for accessing the unlicensed spectrum in response to the second transmission, receiving a third transmission after receiving the second transmission, where the third transmission includes the indication of the second channel access configuration, and transmitting an acknowledgement message for the second transmission based on the indicated second channel access configuration.

Some examples of the method, apparatuses, and non-transitory computer-readable medium described herein may further include operations, features, means, or instructions for suppressing transmission of the acknowledgement message prior to receiving the third transmission based on a channel access capability of the UE.

A method for wireless communication at a base station is described. The method may include transmitting, to a UE, a transmission over at least one of a set of periodically scheduled resources for the UE of a downlink shared channel in an unlicensed spectrum, where the transmission indicates a channel access configuration for the UE for the unlicensed spectrum and receiving a message based on the indicated channel access configuration.

An apparatus for wireless communication at a base station is described. The apparatus may include a processor, memory in electronic communication with the processor, and instructions stored in the memory. The instructions may be executable by the processor to cause the apparatus to transmit, to a UE, a transmission over at least one of a set of periodically scheduled resources for the UE of a downlink shared channel in an unlicensed spectrum, where the transmission indicates a channel access configuration for the UE for the unlicensed spectrum and receive a message based on the indicated channel access configuration.

Another apparatus for wireless communication at a base station is described. The apparatus may include means for transmitting, to a UE, a transmission over at least one of a set of periodically scheduled resources for the UE of a downlink shared channel in an unlicensed spectrum, where the transmission indicates a channel access configuration for the UE for the unlicensed spectrum and means for receiving a message based on the indicated channel access configuration.

A non-transitory computer-readable medium storing code for wireless communication at a base station is described. The code may include instructions executable by a processor to transmit, to a UE, a transmission over at least one of a set of periodically scheduled resources for the UE of a downlink shared channel in an unlicensed spectrum, where the transmission indicates a channel access configuration for the UE for the unlicensed spectrum and receive a message based on the indicated channel access configuration.

In some aspects of the method, apparatuses, and non-transitory computer-readable medium described herein, the transmission includes a control element that indicates the channel access configuration.

In some aspects of the method, apparatuses, and non-transitory computer-readable medium described herein, the message includes an acknowledgement message.

In some aspects of the method, apparatuses, and non-transitory computer-readable medium described herein, the control element indicates at least one uplink channel for transmitting the acknowledgement message.

In some aspects of the method, apparatuses, and non-transitory computer-readable medium described herein, the at least one uplink channel includes an uplink control channel, a configured-grant uplink shared channel, a random access channel, or a combination thereof.

In some aspects of the method, apparatuses, and non-transitory computer-readable medium described herein, the at least one uplink channel may include operations, features, means, or instructions for receiving a pre-assigned preamble from the UE based on the at least one uplink channel including the random access channel.

In some aspects of the method, apparatuses, and non-transitory computer-readable medium described herein, the at least one uplink channel includes two or more uplink channels, and where the base station receives the acknowledgement message over one of the two or more uplink channels.

In some aspects of the method, apparatuses, and non-transitory computer-readable medium described herein, the at least one uplink channel may include operations, features, means, or instructions for receiving copies of the acknowledgement message over at least two of the two or more uplink channels.

Some examples of the method, apparatuses, and non-transitory computer-readable medium described herein may further include operations, features, means, or instructions for receiving, from the UE, a request for a second transmission, and transmitting the second transmission during a COT associated with a successful acquisition of the unlicensed spectrum by the UE for performing communications based on a channel access procedure.

In some aspects of the method, apparatuses, and non-transitory computer-readable medium described herein, the second transmission may be transmitted at least partially over resources outside of the set of periodically scheduled resources.

In some aspects of the method, apparatuses, and non-transitory computer-readable medium described herein, the second transmission includes a second control element.

In some aspects of the method, apparatuses, and non-transitory computer-readable medium described herein, the channel access procedure includes a listen-before-talk procedure with random back off for acquiring a configured-grant uplink channel.

Some examples of the method, apparatuses, and non-transitory computer-readable medium described herein may further include operations, features, means, or instructions for transmitting the transmission over a first TTI of a set of TTIs of a periodically scheduled resource of the set of periodically scheduled resources, where the control element includes an indication to continue monitoring for one or more additional transmissions over additional TTIs of the set of TTIs, and transmitting the one or more additional transmissions over one or more of the additional TTIs of the set of TTIs.

Some examples of the method, apparatuses, and non-transitory computer-readable medium described herein may further include operations, features, means, or instructions for receiving the message based on the indicated COT.

Some examples of the method, apparatuses, and non-transitory computer-readable medium described herein may further include operations, features, means, or instructions for receiving the message occurs before an end of the indicated COT.

In some aspects of the method, apparatuses, and non-transitory computer-readable medium described herein, the channel access configuration indicates a one-shot channel access configuration, and where the message may be received before the end of the indicated COT based on the channel access configuration indicating the one-shot channel access configuration.

Some examples of the method, apparatuses, and non-transitory computer-readable medium described herein may further include operations, features, means, or instructions for transmitting a second transmission, where the second transmission includes a second control element that indicates a DFI.

In some aspects of the method, apparatuses, and non-transitory computer-readable medium described herein, the second transmission further includes data for the UE.

In some aspects of the method, apparatuses, and non-transitory computer-readable medium described herein, the control element includes an indication of downlink shared channel transmission to message timing, an uplink control channel resource indicator, a configured-grant uplink shared channel indicator, a preamble index for a random access channel, an indication of an end of a COT, or a combination thereof.

In some aspects of the method, apparatuses, and non-transitory computer-readable medium described herein, the control element may be a MAC-CE.

In some aspects of the method, apparatuses, and non-transitory computer-readable medium described herein, the transmission further includes data for the UE.

Some examples of the method, apparatuses, and non-transitory computer-readable medium described herein may further include operations, features, means, or instructions for transmitting a second transmission, where the second transmission includes a second control element and a copy of the data for the UE.

Some examples of the method, apparatuses, and non-transitory computer-readable medium described herein may further include operations, features, means, or instructions for transmitting a second transmission, where the second transmission includes data for the UE and does not include an indication of a second channel access configuration for accessing the unlicensed spectrum in response to the second transmission, transmitting a third transmission after receiving the second transmission, where the third transmission includes the indication of the second channel access configuration, and receiving an acknowledgement message for the second transmission based on the indicated second channel access configuration.

DETAILED DESCRIPTION

Some user equipment (UE) that perform wireless communications may lack capabilities (e.g., a high enough processing or battery capacity) to support a full range of wireless communication features. For example, New Radio (NR) may support features related to high bandwidth or low latency communications. Some NR UEs, referred to as NR-light UEs, may be designed for simplified or lower cost implementations. However, some features of NR communications may disproportionately affect power consumption for NR-light UEs. For instance, when using physical downlink control channel (PDCCH) or downlink control information (DCI)-based dynamic scheduling to receive a physical downlink shared channel (PDSCH), NR-light UEs may experience increased overhead or increased power consumption as compared to other NR UEs. The NR-light UEs may experience the increased overhead or increased power consumption due to having narrower operation bandwidths, smaller numbers of transmit and receive antennas, a more relaxed time-line, or a combination of these. Additionally, if an NR-light UE is communicating in the unlicensed spectrum, the NR-light UE may experience greater overhead than when communicating in the licensed spectrum due to listen-before-talk (LBT) uncertainty.

To decrease overhead and/or power consumption in one or both scenarios, an NR-light UE may be configured to monitor for a PDSCH transmission from a base station over a set of periodically scheduled resources in an unlicensed spectrum without receiving a corresponding downlink (e.g., dynamic scheduling) grant. The PDSCH transmission may include a medium access control (MAC) control element (MAC-CE) that indicates a channel access configuration (e.g., an LBT configuration) for the UE to access the unlicensed spectrum. The UE may use the indicated channel access configuration to transmit a message (e.g., an acknowledgement (ACK)) to the base station. By receiving PDSCHs without a corresponding grant (e.g., via PDCCH or DCI), the UE may avoid the overhead and/or power consumption associated with monitoring and receiving grants via the PDCCH. Additionally or alternatively, by receiving a channel access configuration in the PDSCH, the UE may decrease overhead associated with communicating in the unlicensed spectrum.

Aspects of the disclosure are initially described in the context of a wireless communications system. Additional aspects of the disclosure are described in the context of an additional wireless communications system, a cluster scheme, and process flows. Aspects of the disclosure are further illustrated by and described with reference to apparatus diagrams, system diagrams, and flowcharts that relate to indication of listen-before-talk configuration for uplink communications.

Figure 1:
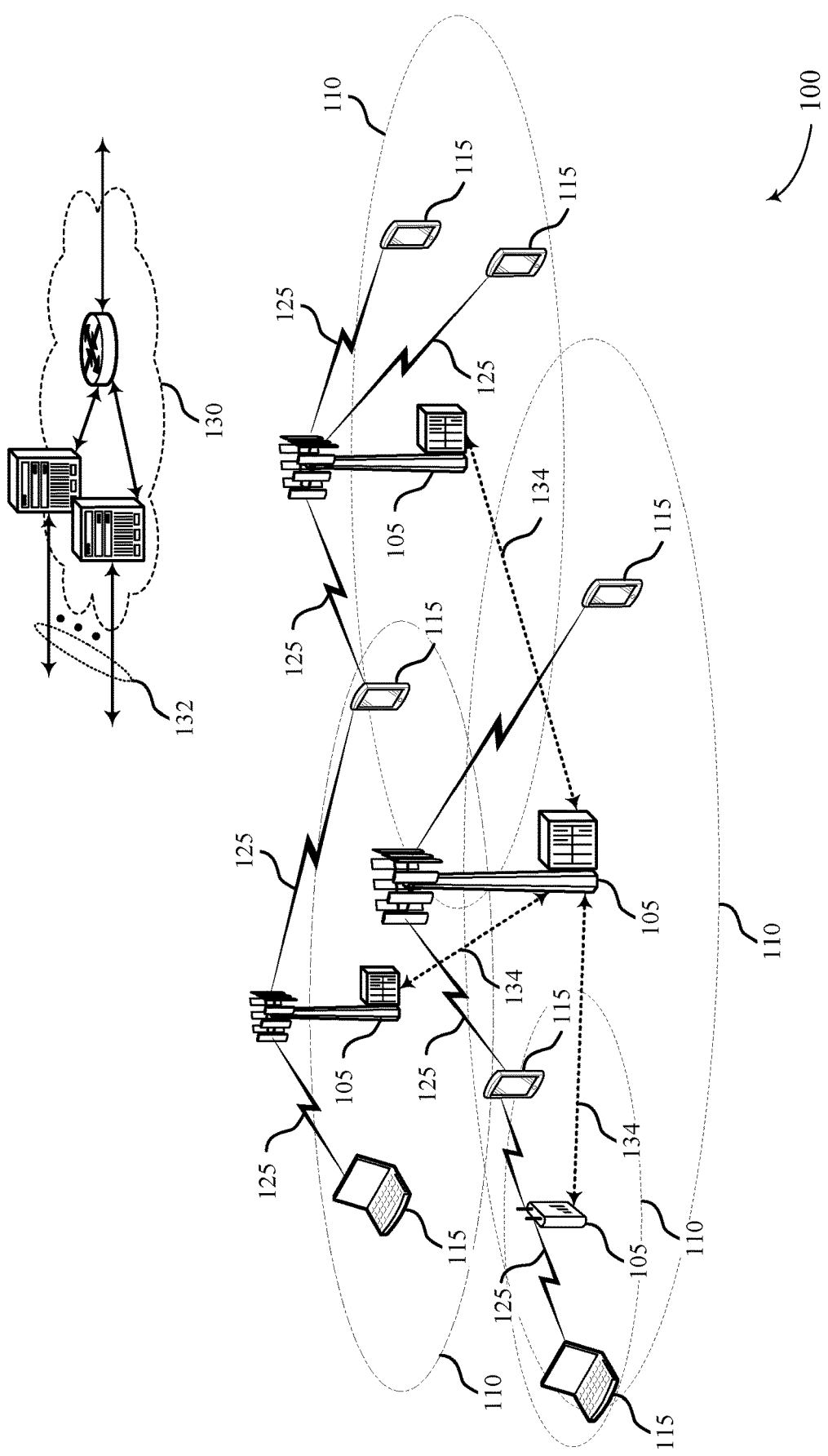
FIG. 1 illustrates an example of a wireless communications system that supports indication of listen-before-talk configuration for uplink communications in accordance with aspects of the present disclosure.

FIG. 1 illustrates an example of a wireless communications system 100 that supports indication of listen-before-talk configuration for uplink communications in accordance with aspects of the present disclosure. The wireless communications system 100 includes base stations 105, UEs 115, and a core network 130. In some aspects, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some aspects, a base station 105 may be movable and therefore provide communication coverage for a moving geographic coverage area 110. In some aspects, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some aspects, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some aspects, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some aspects, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some aspects half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some aspects, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some aspects, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one aspect, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some aspects, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some aspects a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some aspects, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some aspects (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some aspects, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some aspects the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some aspects, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some aspects, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some aspects, NR shared spectrum may increase spectrum utilization and spectral efficiency, specifically through dynamic vertical (e.g., across the frequency domain) and horizontal (e.g., across the time domain) sharing of resources.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

A UE 115 may monitor for a transmission over a set of periodically scheduled resources of a downlink shared channel in an unlicensed spectrum. Monitoring the set of periodically scheduled resources of the downlink shard channel may be performed in place of monitoring of a downlink control channel. The UE 115 may receive the transmission, where the transmission indicates a channel access configuration (e.g., a listen-before-talk (LBT) configuration) for accessing the unlicensed spectrum. In some cases, the transmission may include a medium access control (MAC) control element (MAC-CE) that indicates the channel access configuration. The transmission may additionally indicate at least one uplink channel over which the UE 15 may transmit a message and/or a channel occupancy time (COT) associated with a successful acquisition of the unlicensed spectrum by the base station. The UE 115 may transmit a message (e.g., an acknowledgement (ACK)) based on the channel access configuration.

Figure 2:
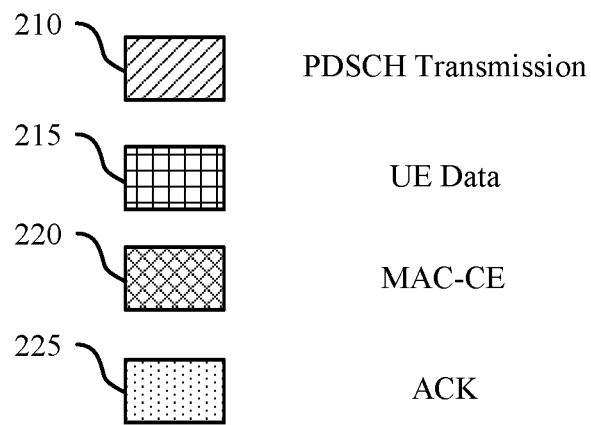
FIG. 2 illustrates an example of a wireless communications system that supports indication of listen-before-talk configuration for uplink communications in accordance with aspects of the present disclosure.
Figure 2:
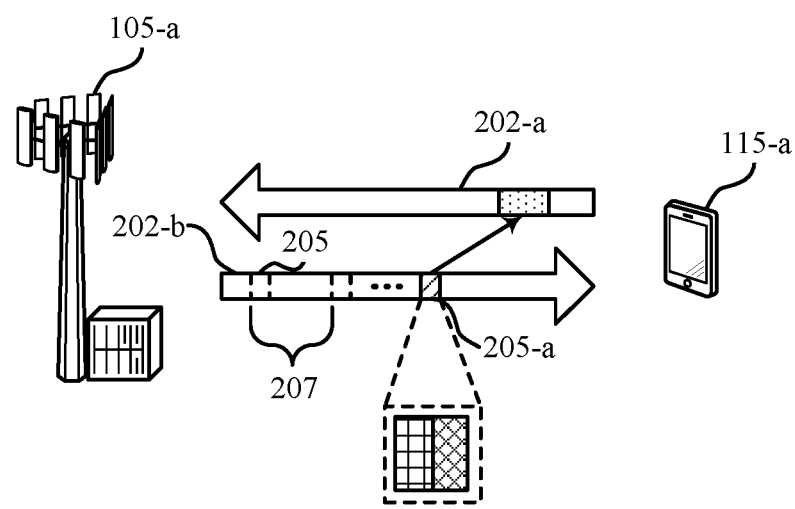

FIG. 2 illustrates an example of a wireless communications system 200 that supports indication of listen-before-talk configuration for uplink communications in accordance with aspects of the present disclosure. In some aspects, wireless communications system 200 may implement aspects of wireless communications system 100. For instance, wireless communications system 200 may include a base station 105-a, which may be an example of a base station 105 as described with reference to FIG. 1, and a UE 115-a, which may be an example of a UE 115 as described with reference to FIG. 1. UE 115-a may perform uplink communications with base station 105-a via communication link 202-a and base station 105-b may perform downlink communications with UE 115-a via communication link 202-b. In some cases, communication link 202-a and communication link 202-b may span a same set of frequencies.

UE 115-a may be configured to monitor or listen at periodic instances 205 for receiving a PDSCH transmission 210. In some cases, the UE 115-a may stop or suppress monitoring of a control channel when configured to monitor for periodic instances 205 of the PDSCH. The periodic instances 205 may be configured via radio resource control (RRC) signaling and may include periodically scheduled resources repeating with a period 207. In some cases, the PDSCH transmission 210 may contain UE data 215 for UE 115-a and a MAC-CE 220 containing information for how to transmit ACKs 225 corresponding to the UE data 215 over an uplink (e.g., communication link 202-a). Such information may include an indication of which channel to transmit the ACKs 225 over and the associated channel access configuration (e.g., an LBT configuration) used to transmit the ACKs 225. In some aspects, the MAC-CE 220 may include a number of bits (e.g., 3 bits) for a PDSCH-to-ACK feedback timing indicator whose value may be an index to a table of numbers that may be predetermined or configured.

The indicated channel for carrying ACKs 225 may be a physical uplink control channel (PUCCH), a configured-grant (CG) PUSCH, a random access channel (RACH), or a combination of channels. If the MAC-CE 220 indicates more than one channel, UE 115-a may choose one channel in the set (e.g., just PUCCH, PUSCH, or the RACH) or may transmit multiple duplicates of the ACK 225 over multiple of the channels (e.g., one duplicate over PUCCH and one duplicate over CG PUSCH). If UE 115-a uses the RACH to transmit an ACK 225, UE 115-a may transmit the ACK 225 with a pre-configured preamble that is contention-free and may do so as part of a 2-step RACH procedure. UE 115-a may choose to use the RACH if it is not able to maintain synchronization for the uplink (e.g., due to a inter-data-packet interval longer than a threshold value). The PUCCH resource indicator within the MAC-CE 220 may consist of 3 bits whose value may be an index to a table of numbers that may be predetermined or configured; the CG-PUSCH resource indicator within the MAC-CE 220 may consist of 4 bits, which may indicate up to 16 configurations; and the preamble index for contention-free 2-step RACH within the MAC-CE 220 may consist of 6 bits.

If UE 115-a lacks a capability to perform advanced adaptive HARQ, UE 115-a may use a simplified implementation. For instance, base station 105-a may transmit a first PDSCH transmission 210 containing UE data 215 and MAC-CE 220 that specifies where to transmit an ACK 225. If UE 115-a does not receive the PDSCH transmission 210 or if base station 105-a fails to receive the corresponding ACK 225, base station 105-a may transmit another PDSCH transmission 210 containing the same UE data 215 as that of the original PDSCH transmission 210 but with a different MAC-CE 220.

For operation in unlicensed spectrum, base station 105-a may check out a COT and may provide an indication of when the COT ends to UE 115-a via the MAC-CE 220. The process of base station 105-a checking out the COT may be referred to as a base station-initiated COT. UE 115-a may use the indication to access the uplink channel before the end of indicated COT (e.g., using one-shot LBT). Generally, one-shot LBT may refer to CAT1 or CAT2 LBT, which may be in load-based-equipment (LBE), or frame-based equipment (FBE). In some cases, the COT ending indication may include 3 bits and may indicate a number of subframes.

Assuming, for instance, that UE 115-a does not support back-off based LBT (e.g., a CAT4 LBT), base station 105-a may send a MAC-CE 220 if the uplink channel may be accessed using one-shot LBT and may not send the MAC-CE 220 otherwise (e.g., if an amount of time left to access the uplink channel is below a threshold amount or if the COT does not support the uplink channel for the ACK 225). In the case that UE 115-a supports back-off based LBT, base station 105-a may send MAC-CE 220 without regard to whether or not the uplink channel may be accessed using one-shot LBT. In such a case, UE 115-a may access the uplink channel using a back-off based LBT procedure and may transmit an ACK 225 upon accessing the uplink channel.

If UE 115-*a* fails to receive a MAC-CE 220 with a first PDSCH transmission 210 (e.g., due to the uplink channel being inaccessible with one-shot LBT before the end of the base-station initiated COT), UE 115-*a* may wait for a next configured instant for a second PDSCH transmission 210 containing a MAC-CE 220 before accessing the uplink channel. The next configured instant may be within a different COT from the COT in which the first PDSCH transmission 210 was sent. The second PDSCH transmission 210 may not contain UE data 215, as UE 115-*a* may use the MAC-CE 220 of the second PDSCH transmission 210 to transmit an ACK 225 for the UE data 215 contained within the first PDSCH transmission 210.

In other cases, UE 115-*a* may check out a COT (i.e., a UE-initiated COT) and may provide a request to base station 105-*a* to transmit a PDSCH transmission 210. In some cases, UE 115-*a* transmitting the request to base station 105-*a* may be referred to as polling. UE 115-*a* may transmit the request if the COT is of a predetermined type (e.g., a CAT4 LBT-based COT from a CG uplink) and may refrain from transmitting the request elsewise. The request may be a one-bit indicator.

Upon receiving the request, base station 105-*a* may transmit a PDSCH transmission 210 over resources at least partially different from periodic instances 205 and which may be within the COT. In some cases, the request may trigger multiple base stations 105 to perform joint or simultaneous transmission of a PDSCH transmission 210. For instance, base station 105-*a* and another base station 105 may receive the request and may both transmit a respective PDSCH transmission 210 to UE 115-*a*. UE 115-*a* may receive a PDSCH transmission 210 from base station 105-*a* and may transmit an ACK 225 for data received from base station 105-*a*. In some cases, the data may have been received in a prior PDSCH transmission 210 which included UE data 215. In such cases, the PDSCH transmission 210 may include a MAC-CE 220 but not UE data 215, as the MAC-CE 220 may indicate a channel for transmitting ACK 225 for the UE data 215 received in the prior PDSCH transmission 210. Alternatively, the current PDSCH transmission 210 may contain both a MAC-CE 220 and UE data 215, in which UE 115-*a* may transmit an ACK 225 for the UE data 215 received in the current PDSCH transmission 210. If UE 115-*a* still has the UE-initiated COT checked out, UE 115-*a* may transmit the ACK 225 within the UE-initiated COT. Alternatively, UE 115-*a* may access an uplink channel indicated by the MAC-CE 220 and may transmit the ACK 225 in the uplink channel indicated by the MAC-CE 220.

In some cases, UE 115-*a* may receive MAC-CE 220 for purposes besides transmitting ACKs. For instance, if UE 115-*a* receives a PDSCH transmission 210 in a gNB-initiated COT, such as described herein, the COT-ending indicator of the MAC-CE 220 may be used for triggering within-COT channel access for PUCCH, configured-grant PUSCH, or physical random access channel (PRACH) for non-ACK purposes. Additionally or alternatively, a MAC-CE 220 may carry a downlink feedback indication (DFI) for a CG uplink. The DFI may be carried in lieu of the channel access configuration and may be carried with UE data 215 or may be carried alone if the PDSCH transmission does not include UE data 215. The DFI may include, for example, an indicator for an aperiodic feedback transmission or other information related to transmission over the CG uplink. There may be cases where the DFI and the channel access configuration may be carried within the same MAC-CE 220.

In general, UE 115-*a* receiving MAC-CE 220 over PDSCH transmission 210 at pre-configured periodic instances 205 may enable UE 115-*a* to have a larger coding gain as compared to having separate PDCCHs and PDSCH transmissions 210. The PDSCH transmission 210 containing the MAC-CE 220 may have more bits than either a PDCCH or a PDSCH transmission alone and may thus be able to be encoded to achieve a higher coding gain. Additionally, base stations 105 communicating with UE 115-*a* may be able to use advanced downlink coordinated multi-point (CoMP) for better performance since PDSCH transmission 210 is arranged at pre-configured instants.

Figure 3:
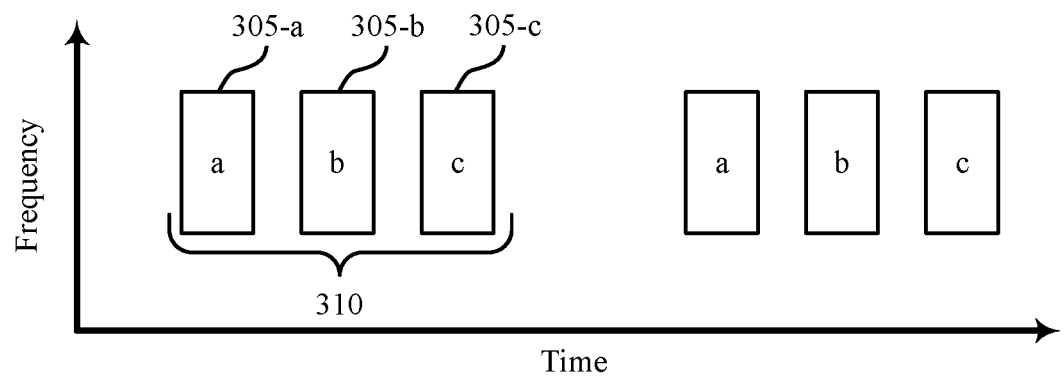
FIG. 3 illustrates an example of a cluster scheme that supports indication of listen-before-talk configuration for uplink communications in accordance with aspects of the present disclosure.

FIG. 3 illustrates an example of a cluster scheme 300 that supports indication of listen-before-talk configuration for uplink communications in accordance with aspects of the present disclosure. In some aspects, cluster scheme 300 may implement aspects of wireless communications system 100. For instance, cluster scheme 300 may be implemented by a base station 105 and/or a UE 115 as described with reference to FIG. 1. In some cases, multiple transmission time intervals (TTIs) 305 may be arranged into a cluster 310. For instance TTIs 305-*a*, 305-*b*, and 305-*c* may be arranged into a cluster 310. Each cluster 310 may represent a periodic instance 205 as described with reference to FIG. 2.

In some cases, a base station 105 may perform LBT to acquire a channel in the unlicensed spectrum before TTI 305-*a*, TTI 305-*b*, or TTI 305-*c*. If a UE 115 receives a PDSCH transmission 210 within a TTI 305 during the associated COT (e.g., TTI 305-*a* if base station 105 acquires the channel before TTI 305-*a*) and successfully decodes the PDSCH transmission 210, the UE 115 may cease from monitoring for PDSCH transmissions 210 in the remaining TTIs 305 (e.g., TTIs 305-*b* and 305-*c*) of the cluster 310. However, if the PDSCH transmission 210 contains a MAC-CE 220, the UE 115 may continue to monitor for PDSCH transmissions 210 in the remaining TTIs 305 (e.g., the remaining TTIs 305 within the COT and/or within the cluster 310). For instance, the MAC-CE 220 may indicate over which TTI 305 the UE 115 is to monitor for the PDSCH transmission 210 or may simply indicate that the UE 115 is to monitor for additional PDSCH transmissions 210 in the remaining TTIs 305.

For the latter case, after receiving an additional PDSCH transmission 210 in an additional TTI 305 (e.g., TTI 305-*b*), the UE 115 may check the MAC-CE 220, if applicable, of the additional PDSCH transmission 210 to determine whether or not to continue to monitor for PDSCH transmissions 210 in the remaining TTIs 305. For instance, if the UE 115 receives an additional PDSCH transmission 210 in TTI 305-*b*, the UE 115 may check the MAC-CE 220 to determine whether or not to monitor for a PDSCH transmission 210 in TTI 305-*c*. Alternatively, the UE 115 may continue monitoring for PDSCH transmissions 210 in the remaining TTIs 305 (e.g., the remaining TTIs 305 within the COT and/or within the cluster 310) after receiving an additional PDSCH transmission 210 without making the determination of whether or not to continue monitoring.

Figure 4:
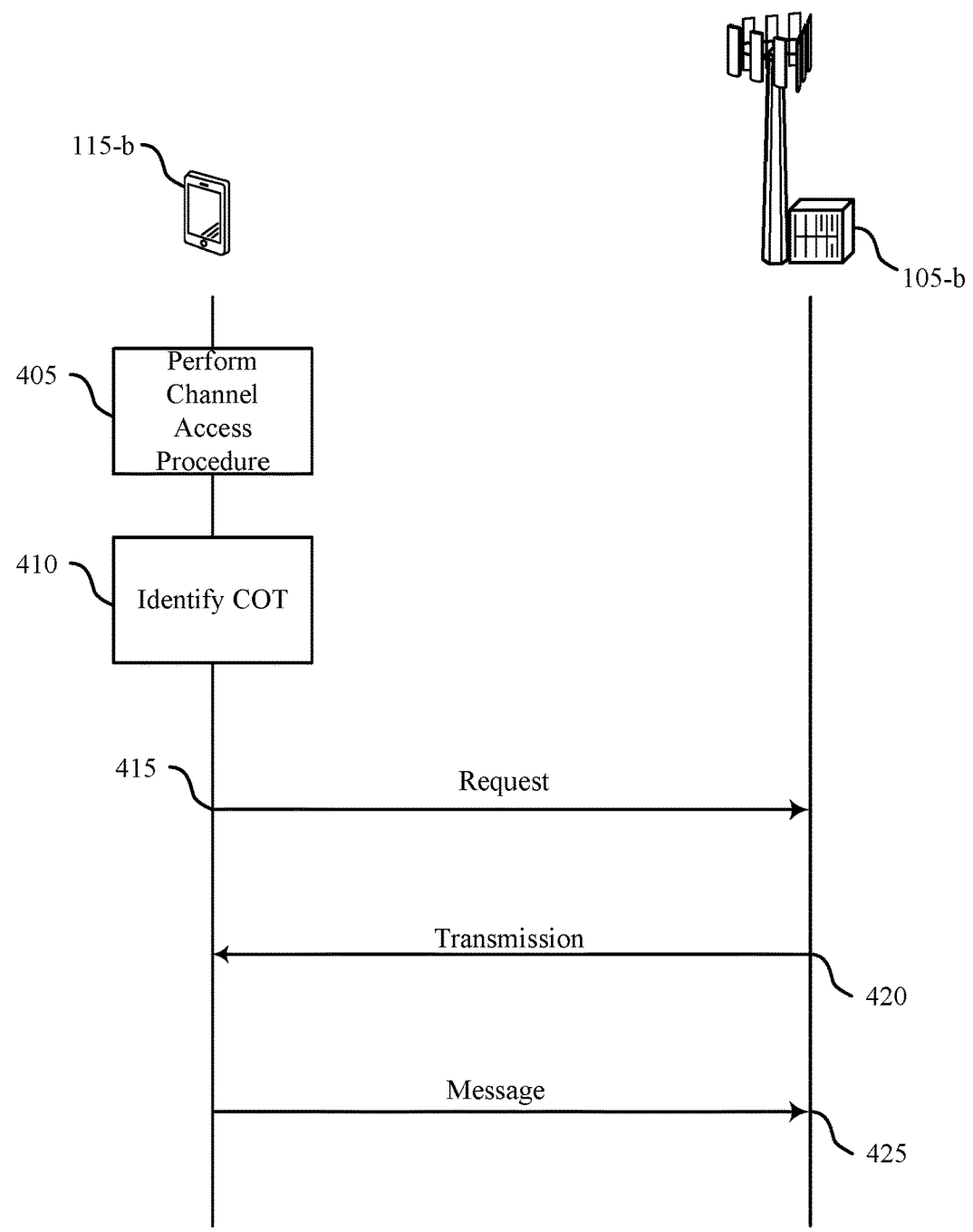
FIG. 4 illustrates an example of a process flow that supports indication of listen-before-talk configuration for uplink communications in accordance with aspects of the present disclosure.

FIG. 4 illustrates an example of a process flow 400 that supports indication of listen-before-talk configuration for uplink communications in accordance with aspects of the present disclosure. In some aspects, process flow 400 may implement aspects of wireless communications system 100. For instance, process flow 400 may include a base station 105-*b*, which may be an example of a base station 105 as described with reference to FIG. 1, and a UE 115-*b*, which may be an example of a UE 115 as described with reference to FIG. 1.

At 405, UE 115-*b* may perform a channel access procedure on the unlicensed spectrum. In some cases, the channel access procedure may include an LBT procedure with random back off for acquiring a CG uplink channel. At 410, UE 115-b may identify a COT associated with a successful acquisition of the unlicensed spectrum for performing communications based on the channel access procedure. At 415, UE 115-b may transmit a request for a transmission (e.g., a PDSCH transmission 210) to base station 105-b. Base station 105-b may receive the request.

At 420, base station 105-b may transmit a transmission. The transmission may indicate a channel access configuration (e.g., an LBT configuration) for UE 115-b for the unlicensed spectrum. In some cases, the transmission may include a control element (e.g., a MAC-CE 220) that indicates the channel access configuration. In some cases, the transmission may not include data for UE 115-b (e.g., UE data 215).

The transmission may be received based on the request transmitted at 415 and may be received during the COT associated with the successful acquisition by UE 115-b. Additionally, a second transmission may be received from another base station 105 during the COT associated with the successful acquisition by UE 115-b. In some cases, the transmission may be received at least partially over resources outside of a set of periodically scheduled resources.

At 425, UE 115-b may transmit a message (e.g., an ACK) based on the channel access configuration. UE 115-b may use an uplink channel indicated by the transmission (e.g., by the MAC-CE). The at least one uplink channel may include an uplink control channel, a CG uplink shared channel, a RACH, or a combination thereof. If the at least one uplink channel includes the RACH, UE 115-b may transmit a pre-assigned preamble to base station 105-b based on the at least one uplink channel including the RACH. If the at least one uplink channel includes two or more uplink channels, UE 115-b may select one of them for transmitting the message. Alternatively, UE 115-b may use multiple of the two or more uplink channels to transmit duplicates of the message.

Figure 5:
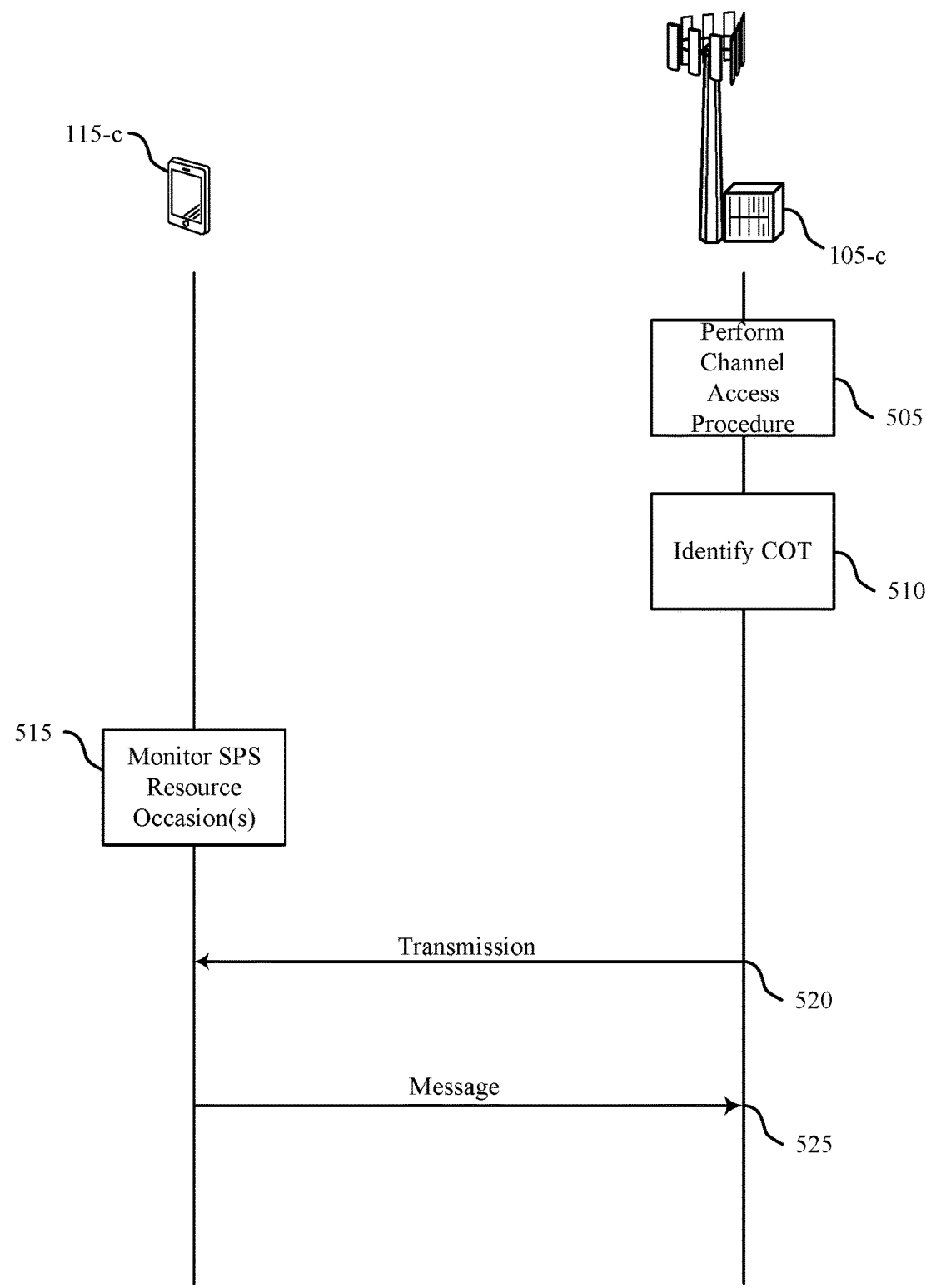
FIG. 5 illustrates an example of a process flow that supports indication of listen-before-talk configuration for uplink communications in accordance with aspects of the present disclosure.

FIG. 5 illustrates an example of a process flow 500 that supports indication of listen-before-talk configuration for uplink communications in accordance with aspects of the present disclosure. In some aspects, process flow 500 may implement aspects of wireless communications system 100. For instance, process flow 500 may include a base station 105-c, which may be an example of a base station 105 as described with reference to FIG. 1, and a UE 115-c, which may be an example of a UE 115 as described with reference to FIG. 1.

At 505, base station 105-c may perform a channel access procedure on the unlicensed spectrum. At 510, base station 105-c may identify a COT associated with a successful acquisition of the unlicensed spectrum for performing communications based on the channel access procedure.

At 515, UE 115-c may monitor for a transmission (e.g., a PDSCH transmission 210) over a set of periodically scheduled resources (e.g., periodic instances 205) of a downlink shared channel in an unlicensed spectrum.

At 520, base station 105-c may transmit the transmission over at least one of the set of periodically scheduled resources for the UE of the downlink shared channel in the unlicensed spectrum. The transmission may indicate a channel access configuration (e.g., an LBT configuration) for UE 115-c for the unlicensed spectrum. In some cases, the transmission may include a control element (e.g., a MAC-CE 220) that indicates the channel access configuration. Additionally, the transmission may include data for UE 115-c (e.g., UE data 215).

In some aspects, the control element may indicate a COT associated with the transmission. The channel access configuration may indicate a one-shot channel access configuration. In some cases, UE 115-b may receive a second transmission from base station 105-b that indicates a DFI. The second transmission may include data for UE 115-b (e.g., UE data 215).

In some cases, each of the set of periodically scheduled resources may include a set of TTIs (e.g., TTIs 305). In such cases, UE 115-c may receive the transmission over a first TTI of the set of TTIs of a periodically scheduled resource and may identify, from the control element of the transmission, an indication to continue monitoring for one or more additional transmissions over additional TTIs of the set. UE 115-c may continue to monitor for the one or more additional transmissions over the additional TTIs of the set of TTIs after identifying the indication to continue monitoring.

In some aspects, base station 105-c may transmit a second transmission (e.g., a second PDSCH transmission), where the second transmission includes a second control element (e.g., a second MAC-CE 220) and a copy of the data for UE 115-c (e.g., UE data 215).

In some cases, UE 115-c may receive a second transmission (e.g., a PDSCH), where the second transmission includes data for UE 115-c and does not include an indication of a second channel access configuration for accessing the unlicensed spectrum in response to the second transmission. UE 115-c may receive a third transmission after receiving the second transmission, the third transmission including an indication of a second channel access configuration (e.g., via a MAC-CE).

At 525, UE 115-c may transmit a message (e.g., an ACK 225) based on the channel access configuration. UE 115-c may use an uplink channel indicated by the transmission (e.g., by the MAC-CE). The at least one uplink channel may include an uplink control channel, a CG uplink shared channel, a RACH, or a combination thereof. If the at least one uplink channel includes the RACH, UE 115-c may transmit a pre-assigned preamble to base station 105-c based on the at least one uplink channel including the RACH. If the at least one uplink channel includes two or more uplink channels, UE 115-c may select one of them for transmitting the message. Alternatively, UE 115-c may use multiple of the two or more uplink channels to transmit duplicates of the message. In some cases, transmitting the message occurs before an end of the indicated COT (e.g., at 520). UE 115-c may transmit the message before the end of the indicated COT based on the one-shot channel access configuration being indicated by the channel access configuration.

Figure 6:
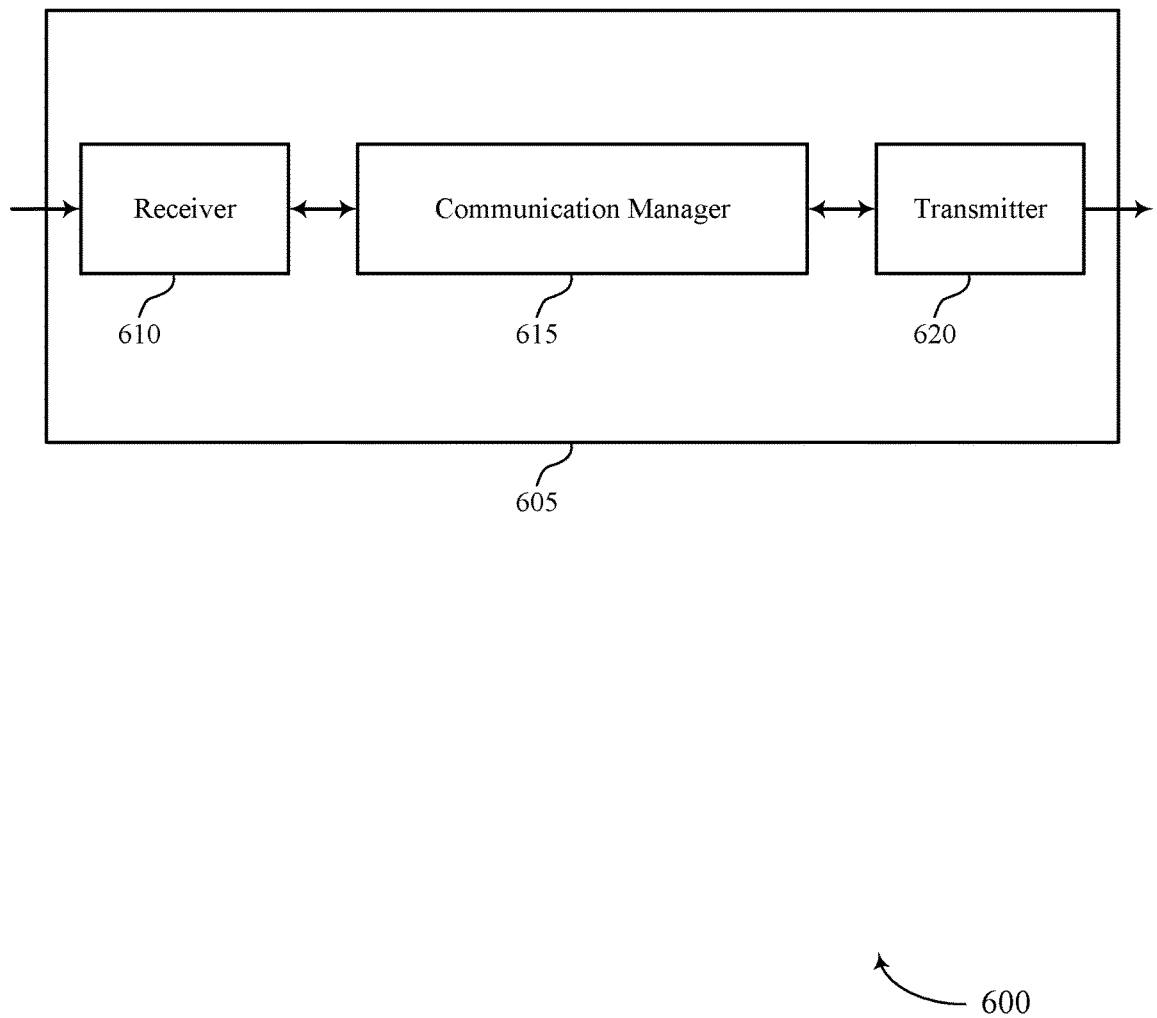
FIGS. 6 and 7 show block diagrams of devices that support indication of listen-before-talk configuration for uplink communications in accordance with aspects of the present disclosure.

FIG. 6 shows a block diagram 600 of a device 605 that supports indication of listen-before-talk configuration for uplink communications in accordance with aspects of the present disclosure. The device 605 may be an example of aspects of a UE 115 as described herein. The device 605 may include a receiver 610, a communication manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to indication of listen-before-talk configuration for uplink communications, etc.). Information may be passed on to other components of the device 605.

The receiver 610 may be an example of aspects of the transceiver 915 described with reference to FIG. 9. The receiver 610 may utilize a single antenna or a set of antennas.

The communication manager 615 may monitor for a transmission over a set of periodically scheduled resources of a downlink shared channel in an unlicensed spectrum, receive the transmission, where the transmission indicates a channel access configuration for the UE for accessing the unlicensed spectrum, and transmit a message based on the channel access configuration. The communication manager 615 may be an example of aspects of the communication manager 910 described herein.

In some examples, the communication manager 615 receiving the transmission over a set of periodically scheduled resources may have one or more advantages. For instance, receiving the transmission at pre-configured periodic instances may enable the communication manager 615 to have a larger coding gain as compared to having separate transmissions for performing scheduling. The transmission may have more bits than either a data transmission or a control transmission scheduling the data transmission alone and may thus be able to be encoded to achieve a higher coding gain. Additionally, by receiving an indication of channel access configuration in the transmission, the communication manager 615 may decrease overhead associated with communicating in the unlicensed spectrum.

The communication manager 615, or its sub-components, may be implemented in hardware, code (e.g., software or firmware) executed by a processor, or any combination thereof. If implemented in code executed by a processor, the functions of the communication manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 615, or its sub-components, may be physically located at various positions, including being distributed such that portions of functions are implemented at different physical locations by one or more physical components. In some aspects, the communication manager 615, or its sub-components, may be a separate and distinct component in accordance with various aspects of the present disclosure. In some aspects, the communication manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some aspects, the transmitter 620 may be collocated with a receiver 610 in a transceiver module. For example, the transmitter 620 may be an example of aspects of the transceiver 915 described with reference to FIG. 9. The transmitter 620 may utilize a single antenna or a set of antennas.

Figure 7:
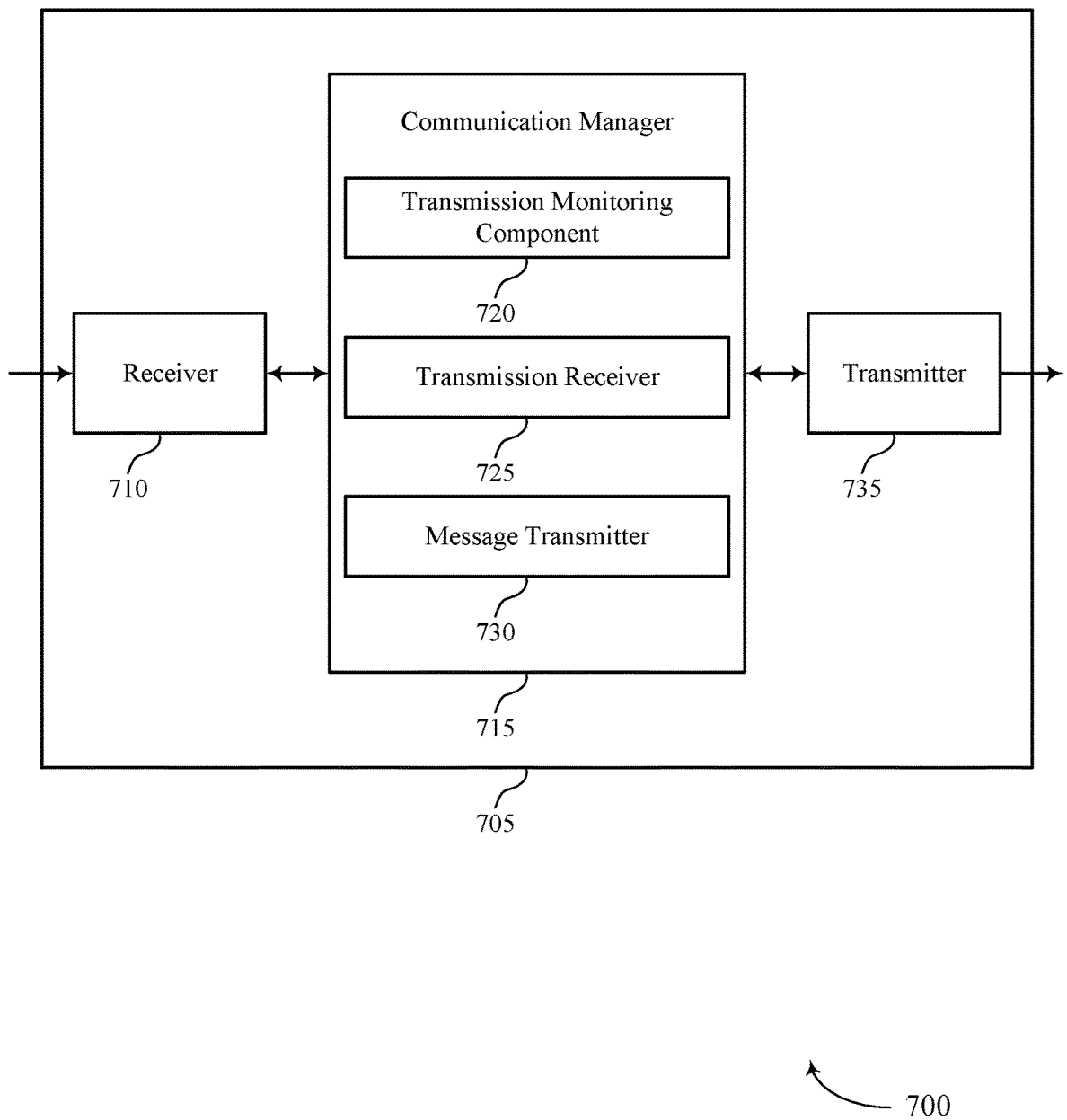

FIG. 7 shows a block diagram 700 of a device 705 that supports indication of listen-before-talk configuration for uplink communications in accordance with aspects of the present disclosure. The device 705 may be an example of aspects of a device 605, or a UE 115 as described herein. The device 705 may include a receiver 710, a communication manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to indication of listen-before-talk configuration for uplink communications, etc.). Information may be passed on to other components of the device 705. The receiver 710 may be an example of aspects of the transceiver 915 described with reference to FIG. 9. The receiver 710 may utilize a single antenna or a set of antennas.

The communication manager 715 may be an example of aspects of the communication manager 615 as described herein. The communication manager 715 may include a transmission monitoring component 720, a transmission receiver 725, and a message transmitter 730. The communication manager 715 may be an example of aspects of the communication manager 910 described herein.

The transmission monitoring component 720 may monitor for a transmission over a set of periodically scheduled resources of a downlink shared channel in an unlicensed spectrum.

The transmission receiver 725 may receive the transmission, where the transmission indicates a channel access configuration for the UE for accessing the unlicensed spectrum.

The message transmitter 730 may transmit a message based on the channel access configuration.

The transmitter 735 may transmit signals generated by other components of the device 705. In some aspects, the transmitter 735 may be collocated with a receiver 710 in a transceiver module. For example, the transmitter 735 may be an example of aspects of the transceiver 915 described with reference to FIG. 9. The transmitter 735 may utilize a single antenna or a set of antennas.

In some examples, the transmission receiver 725 receiving the transmission over a set of periodically scheduled resources may have one or more advantages. For instance, receiving the transmission at pre-configured periodic instances may enable the transmission receiver 725 to have a larger coding gain as compared to having separate transmissions for performing scheduling. The transmission may have more bits than either a data transmission or a control transmission scheduling the data transmission alone and may thus be able to be encoded to achieve a higher coding gain. Additionally, by receiving an indication of channel access configuration in the transmission, the transmission receiver 725 may decrease overhead associated with communicating in the unlicensed spectrum.

Figure 8:
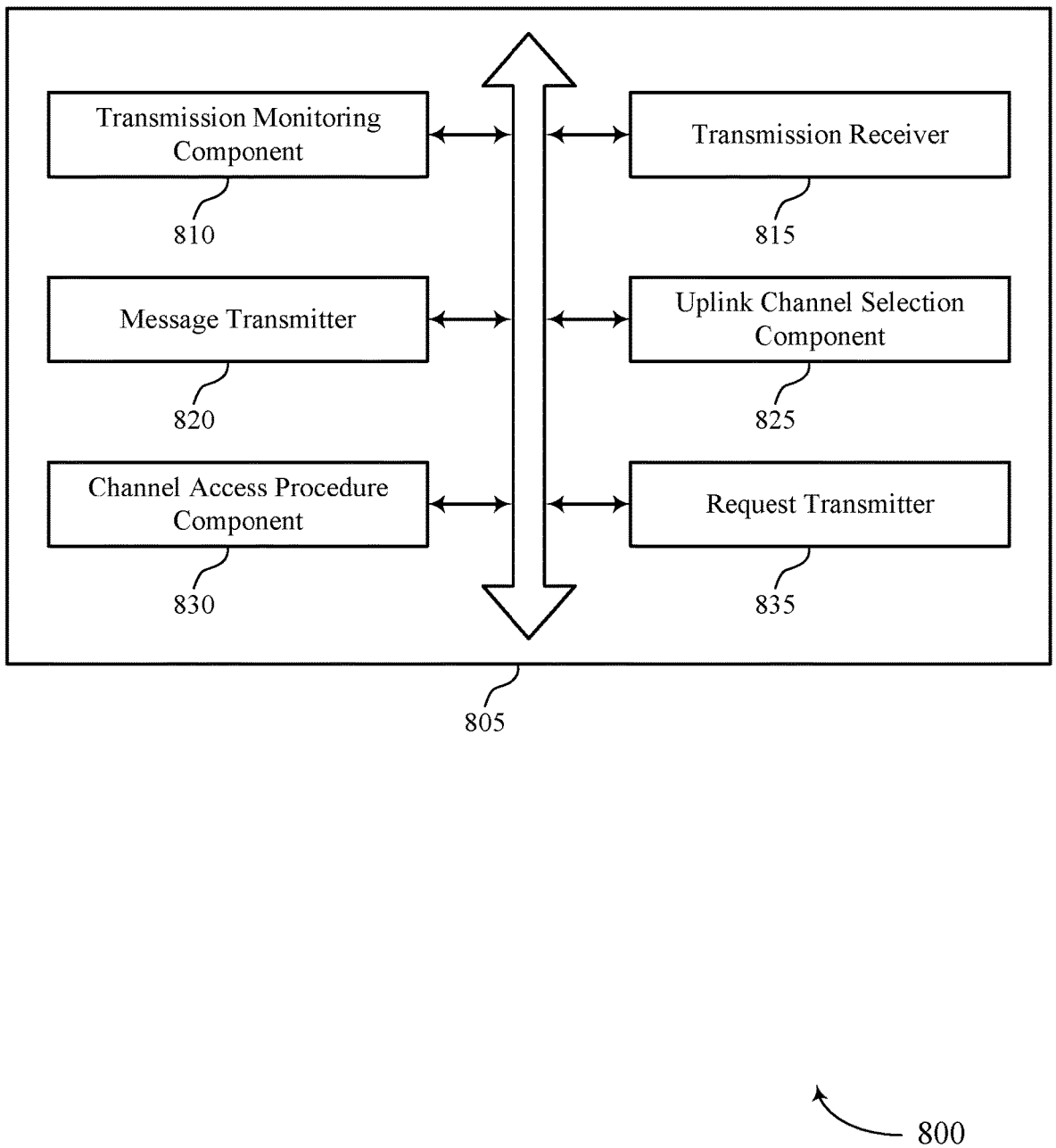
FIG. 8 shows a block diagram of a communication manager that supports indication of listen-before-talk configuration for uplink communications in accordance with aspects of the present disclosure.

FIG. 8 shows a block diagram 800 of a communication manager 805 that supports indication of listen-before-talk configuration for uplink communications in accordance with aspects of the present disclosure. The communication manager 805 may be an example of aspects of a communication manager 615, a communication manager 715, or a communication manager 910 described herein. The communication manager 805 may include a transmission monitoring component 810, a transmission receiver 815, a message transmitter 820, an uplink channel selection component 825, a channel access procedure component 830, and a request transmitter 835. Each of these modules may communicate, directly or indirectly, with one another (e.g., via one or more buses).

The transmission monitoring component 810 may monitor for a transmission over a set of periodically scheduled resources of a downlink shared channel in an unlicensed spectrum. In some aspects, the transmission monitoring component 810 may identify, from the control element, an indication to continue monitoring for one or more additional transmissions over additional TTIs of the set of TTIs. In some aspects, the transmission monitoring component 810 may continue to monitor for the one or more additional transmissions over the additional TTIs of the set of TTIs after identifying the indication to continue the monitoring.

The transmission receiver 815 may receive the transmission, where the transmission indicates a channel access configuration for the UE for accessing the unlicensed spectrum. In some aspects, the transmission receiver 815 may transmit a pre-assigned preamble to a base station based on the at least one uplink channel including the random access channel. In some aspects, receiving a second transmission, where the second transmission includes a second control element and a copy of the data for the UE. In some aspects, the transmission receiver 815 may receive the second transmission from the base station during the COT. In some aspects, the transmission receiver 815 may receive a third transmission from a second base station during the COT. In some aspects, the transmission receiver 815 may receive the transmission over a first TTI of a set of TTIs of a periodically scheduled resource. In some aspects, receiving a second transmission, where the second transmission includes a second control element that indicates a downlink feedback indication (DFI). In some aspects, receiving a second transmission, where the second transmission includes data for the UE and does not include an indication of a second channel access configuration for accessing the unlicensed spectrum in response to the second transmission. In some aspects, receiving a third transmission after receiving the second transmission, where the third transmission includes the indication of the second channel access configuration. In some cases, the transmission includes a control element that indicates the channel access configuration. In some cases, the at least one uplink channel includes an uplink control channel, a configured-grant uplink shared channel, a random access channel, or a combination thereof. In some cases, the transmission further includes data for the UE. In some cases, the second transmission includes a second control element. In some cases, the second transmission further includes data for the UE. In some cases, the control element includes an indication of downlink shared channel transmission to message timing, an uplink control channel resource indicator, a configured-grant uplink shared channel indicator, a preamble index for a random access channel, an indication of an end of a channel occupancy time (COT), or a combination thereof.

The message transmitter 820 may transmit a message based on the channel access configuration. In some aspects, the message transmitter 820 may transmit an acknowledgement message for the second transmission based on the indicated second channel access configuration. In some aspects, the message transmitter 820 may suppress transmission of the acknowledgement message prior to receiving the third transmission based on a channel access capability of the UE. In some cases, the message includes an acknowledgement message associated with the transmission.

The uplink channel selection component 825 may select one uplink channel of the two or more uplink channels for transmitting the acknowledgement message. In some aspects, the uplink channel selection component 825 may transmit copies of the acknowledgement message over at least two of the two or more uplink channels.

The channel access procedure component 830 may perform a channel access procedure on the unlicensed spectrum. In some aspects, the channel access procedure component 830 may identify a channel occupancy time (COT) associated with a successful acquisition of the unlicensed spectrum for performing communications based on the channel access procedure. In some cases, the channel access procedure includes a listen-before-talk procedure with random back off for acquiring a configured-grant uplink channel.

The request transmitter 835 may transmit a request for a second transmission to a base station.

Figure 9:
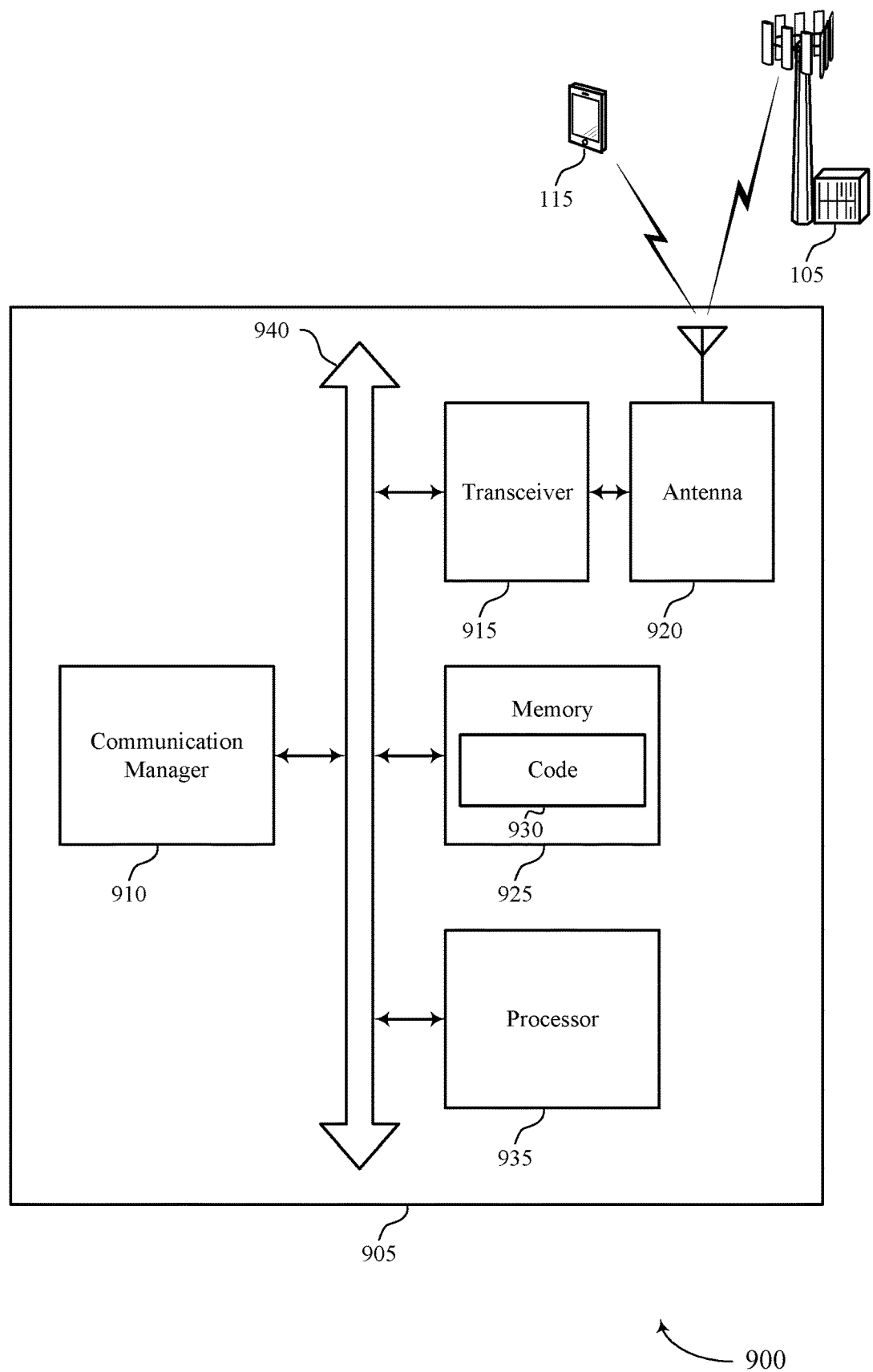
FIG. 9 shows a diagram of a system including a device that supports indication of listen-before-talk configuration for uplink communications in accordance with aspects of the present disclosure.

FIG. 9 shows a diagram of a system 900 including a device 905 that supports indication of listen-before-talk configuration for uplink communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communication manager 910, a transceiver 915, an antenna 920, memory 925, and a processor 935. These components may be in electronic communication via one or more buses (e.g., bus 940).

The communication manager 910 may monitor for a transmission over a set of periodically scheduled resources of a downlink shared channel in an unlicensed spectrum, receive the transmission, where the transmission indicates a channel access configuration for the UE for accessing the unlicensed spectrum, and transmit a message based on the channel access configuration.

The transceiver 915 may communicate bi-directionally, via one or more antennas, wired, or wireless links as described above. For example, the transceiver 915 may represent a wireless transceiver and may communicate bi-directionally with another wireless transceiver. The transceiver 915 may also include a modem to modulate the packets and provide the modulated packets to the antennas for transmission, and to demodulate packets received from the antennas.

In some cases, the wireless device may include a single antenna 920. However, in some cases the device may have more than one antenna 920, which may be capable of concurrently transmitting or receiving multiple wireless transmissions.

The memory 925 may include random-access memory (RAM) and read-only memory (ROM). The memory 925 may store computer-readable, computer-executable code 930 including instructions that, when executed, cause the processor to perform various functions described herein. In some cases, the memory 925 may contain, among other things, a basic input/output system (BIOS) which may control basic hardware or software operation such as the interaction with peripheral components or devices.

The code 930 may include instructions to implement aspects of the present disclosure, including instructions to support wireless communications. The code 930 may be stored in a non-transitory computer-readable medium such as system memory or other type of memory. In some cases, the code 930 may not be directly executable by the processor 935 but may cause a computer (e.g., when compiled and executed) to perform functions described herein.

The processor 935 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in a memory (e.g., the memory 925) to cause the device 905 to perform various functions (e.g., functions or tasks supporting indication of listen-before-talk configuration for uplink communications).

Figure 10:
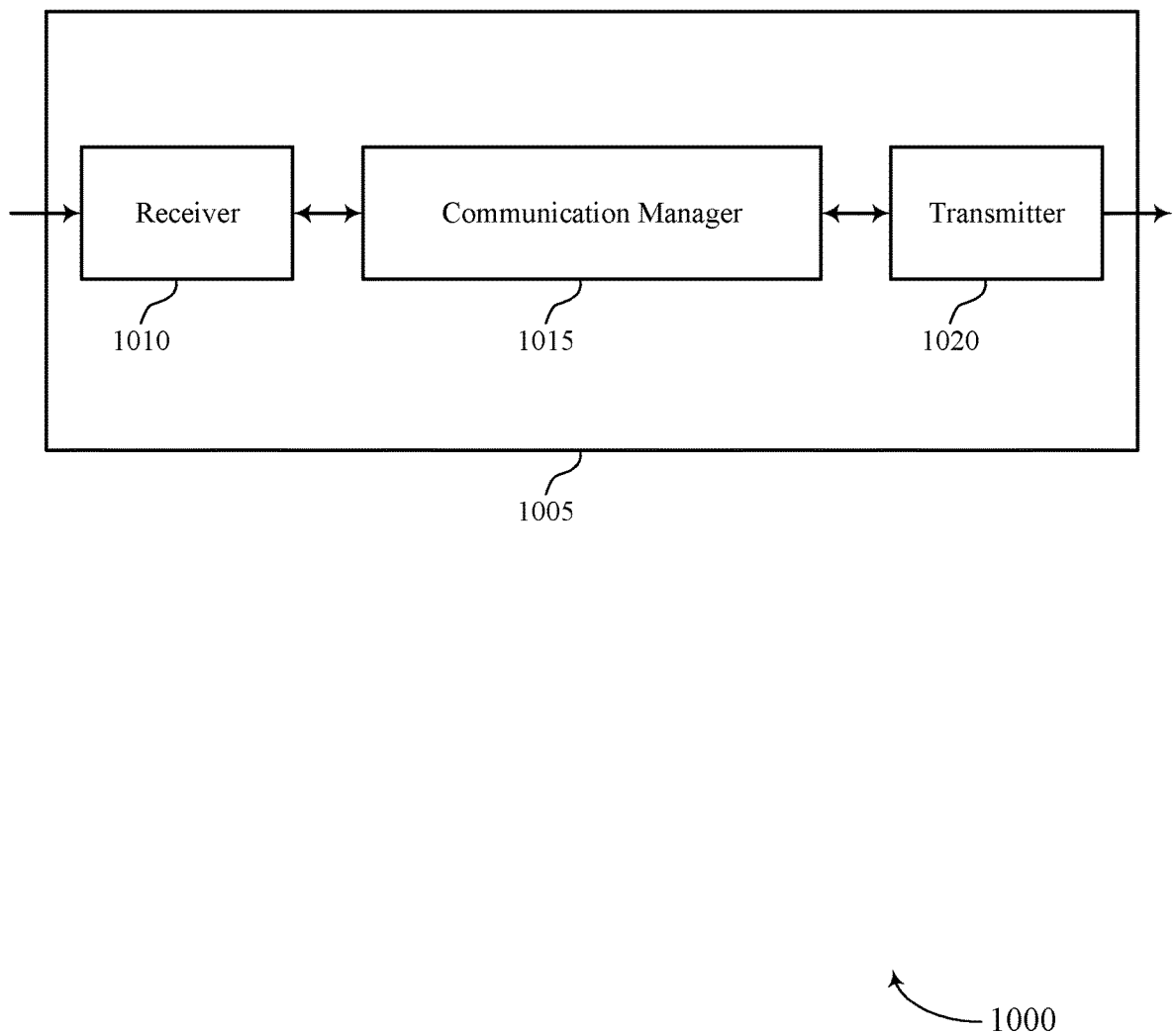
FIGS. 10 and 11 show block diagrams of devices that support indication of listen-before-talk configuration for uplink communications in accordance with aspects of the present disclosure.

FIG. 10 shows a block diagram 1000 of a device 1005 that supports indication of listen-before-talk configuration for uplink communications in accordance with aspects of the present disclosure. The device 1005 may be an example of aspects of a base station 105 as described herein. The device 1005 may include a receiver 1010, a communication manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to indication of listen-before-talk configuration for uplink communications, etc.). Information may be passed on to other components of the device 1005. The receiver 1010 may be an example of aspects of the transceiver 1320 described with reference to FIG. 13. The receiver 1010 may utilize a single antenna or a set of antennas.

The communication manager 1015 may transmit, to a UE, a transmission over at least one of a set of periodically scheduled resources for the UE of a downlink shared channel in an unlicensed spectrum, where the transmission indicates a channel access configuration for the UE for the unlicensed spectrum and receive a message based on the indicated channel access configuration. The communication manager 1015 may be an example of aspects of the communication manager 1310 described herein.

In some examples, the communication manager 1015 transmitting the transmission over a set of periodically scheduled resources may have one or more advantages. For instance, transmitting the transmission at pre-configured periodic instances may enable the communication manager 1015 to have a larger coding gain as compared to having separate transmissions for performing scheduling. The transmission may have more bits than either a data transmission or a control transmission scheduling the data transmission alone and may thus be able to be encoded to achieve a higher coding gain. Additionally, the communication manager 1015 when communicating with a UE 115 may be able to use advanced downlink CoMP for better performance since the transmission is arranged at pre-configured instants. Additionally, by transmitting an indication of channel access configuration in the transmission, the communication manager 1015 may decrease overhead associated with communicating in the unlicensed spectrum.

The communication manager 1015, or its sub-components, may be implemented in hardware, code (e.g., software or firmware) executed by a processor, or any combination thereof. If implemented in code executed by a processor, the functions of the communication manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 1015, or its sub-components, may be physically located at various positions, including being distributed such that portions of functions are implemented at different physical locations by one or more physical components. In some aspects, the communication manager 1015, or its sub-components, may be a separate and distinct component in accordance with various aspects of the present disclosure. In some aspects, the communication manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some aspects, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
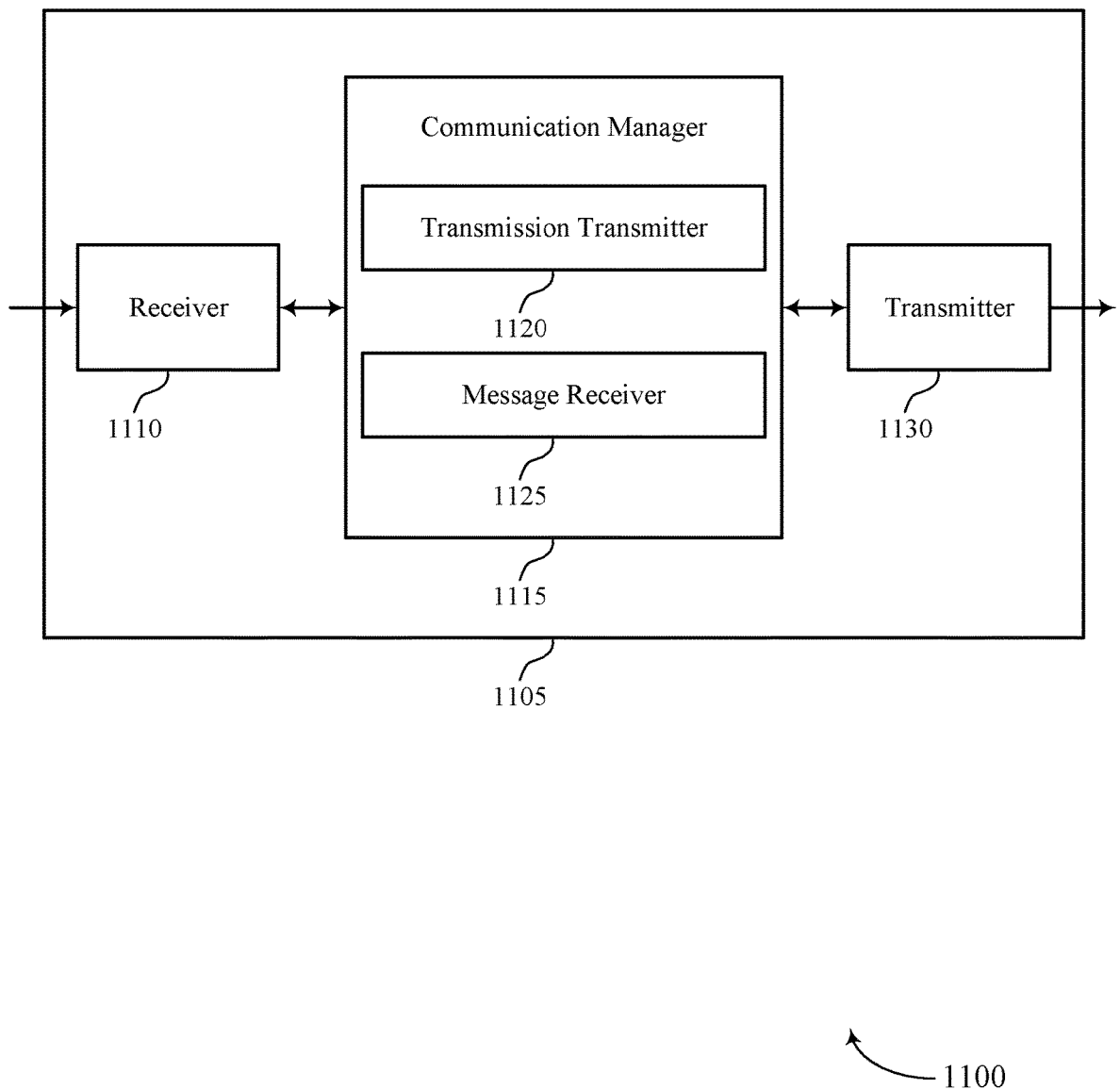

FIG. 11 shows a block diagram 1100 of a device 1105 that supports indication of listen-before-talk configuration for uplink communications in accordance with aspects of the present disclosure. The device 1105 may be an example of aspects of a device 1005, or a base station 105 as described herein. The device 1105 may include a receiver 1110, a communication manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to indication of listen-before-talk configuration for uplink communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communication manager 1115 may be an example of aspects of the communication manager 1015 as described herein. The communication manager 1115 may include a transmission transmitter 1120 and a message receiver 1125. The communication manager 1115 may be an example of aspects of the communication manager 1310 described herein.

The transmission transmitter 1120 may transmit, to a UE, a transmission over at least one of a set of periodically scheduled resources for the UE of a downlink shared channel in an unlicensed spectrum, where the transmission indicates a channel access configuration for the UE for the unlicensed spectrum.

The message receiver 1125 may receive a message based on the indicated channel access configuration.

The transmitter 1130 may transmit signals generated by other components of the device 1105. In some aspects, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

In some examples, the transmission transmitter 1120 transmitting the transmission over a set of periodically scheduled resources may have one or more advantages. For instance, transmitting the transmission at pre-configured periodic instances may enable the transmission transmitter 1120 to have a larger coding gain as compared to having separate transmissions for performing scheduling. The transmission may have more bits than either a data transmission or a control transmission scheduling the data transmission alone and may thus be able to be encoded to achieve a higher coding gain. Additionally, the transmission transmitter 1120 when communicating with a UE 115 may be able to use advanced downlink CoMP for better performance since the transmission is arranged at pre-configured instants. Additionally, by transmitting an indication of channel access configuration in the transmission, the transmission transmitter 1120 may decrease overhead associated with communicating in the unlicensed spectrum.

Figure 12:
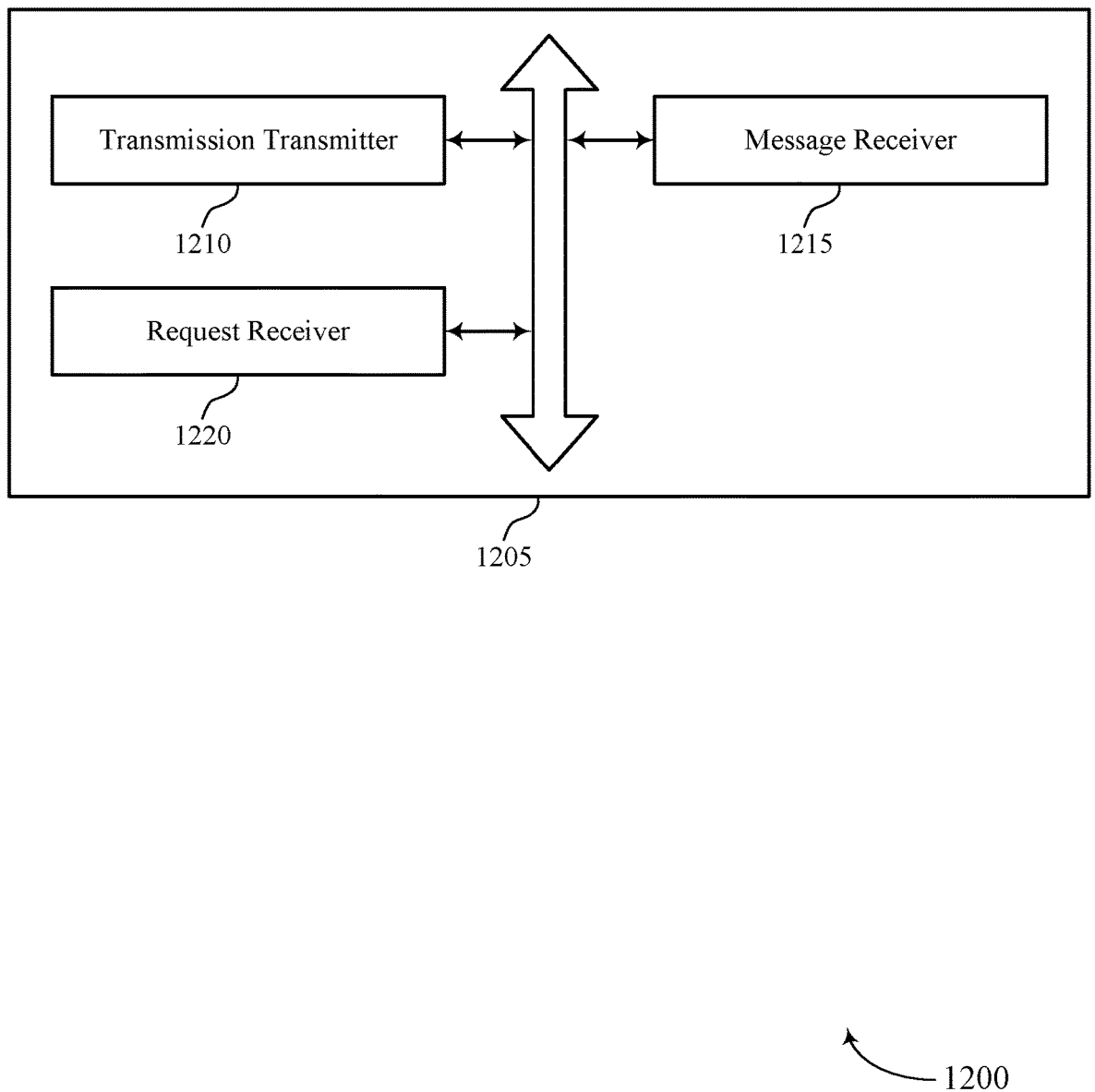
FIG. 12 shows a block diagram of a communication manager that supports indication of listen-before-talk configuration for uplink communications in accordance with aspects of the present disclosure.

FIG. 12 shows a block diagram 1200 of a communication manager 1205 that supports indication of listen-before-talk configuration for uplink communications in accordance with aspects of the present disclosure. The communication manager 1205 may be an example of aspects of a communication manager 1015, a communication manager 1115, or a communication manager 1310 described herein. The communication manager 1205 may include a transmission transmitter 1210, a message receiver 1215, and a request receiver 1220. Each of these modules may communicate, directly or indirectly, with one another (e.g., via one or more buses).

The transmission transmitter 1210 may transmit, to a UE, a transmission over at least one of a set of periodically scheduled resources for the UE of a downlink shared channel in an unlicensed spectrum, where the transmission indicates a channel access configuration for the UE for the unlicensed spectrum. In some aspects, the transmission transmitter 1210 may transmit the second transmission during a channel occupancy time (COT) associated with a successful acquisition of the unlicensed spectrum by the UE for performing communications based on a channel access procedure. In some aspects, transmit the transmission over a first TTI of a set of TTIs of a periodically scheduled resource of the set of periodically scheduled resources, where the control element includes an indication to continue monitoring for one or more additional transmissions over additional TTIs of the set of TTIs. In some aspects, the transmission transmitter 1210 may transmit the one or more additional transmissions over one or more of the additional TTIs of the set of TTIs.

In some aspects, transmit a second transmission, where the second transmission includes a second control element that indicates a downlink feedback indication (DFI). In some aspects, transmit a second transmission, where the second transmission includes a second control element and a copy of the data for the UE. In some aspects, transmit a second transmission, where the second transmission includes data for the UE and does not include an indication of a second channel access configuration for accessing the unlicensed spectrum in response to the second transmission. In some aspects, transmit a third transmission after receiving the second transmission, where the third transmission includes the indication of the second channel access configuration. In some cases, the transmission includes a control element that indicates the channel access configuration. In some cases, the at least one uplink channel includes an uplink control channel, a configured-grant uplink shared channel, a random access channel, or a combination thereof. In some cases, the second transmission includes a second control element. In some cases, the channel access procedure includes a listen-before-talk procedure with random back off for acquiring a configured-grant uplink channel. In some cases, the second transmission further includes data for the UE. In some cases, the control element includes an indication of downlink shared channel transmission to message timing, an uplink control channel resource indicator, a configured-grant uplink shared channel indicator, a preamble index for a random access channel, an indication of an end of a channel occupancy time (COT), or a combination thereof. In some cases, the transmission further includes data for the UE.

The message receiver 1215 may receive a message based on the indicated channel access configuration. In some aspects, the message receiver 1215 may receive a pre-assigned preamble from the UE based on the at least one uplink channel including the random access channel. In some aspects, the message receiver 1215 may receive copies of the acknowledgement message over at least two of the two or more uplink channels. In some aspects, the message receiver 1215 may receive an acknowledgement message for the second transmission based on the indicated second channel access configuration. In some cases, the message includes an acknowledgement message. In some cases, the at least one uplink channel includes two or more uplink channels, and where the base station receives the acknowledgement message over one of the two or more uplink channels.

The request receiver 1220 may receive, from the UE, a request for a second transmission.

Figure 13:
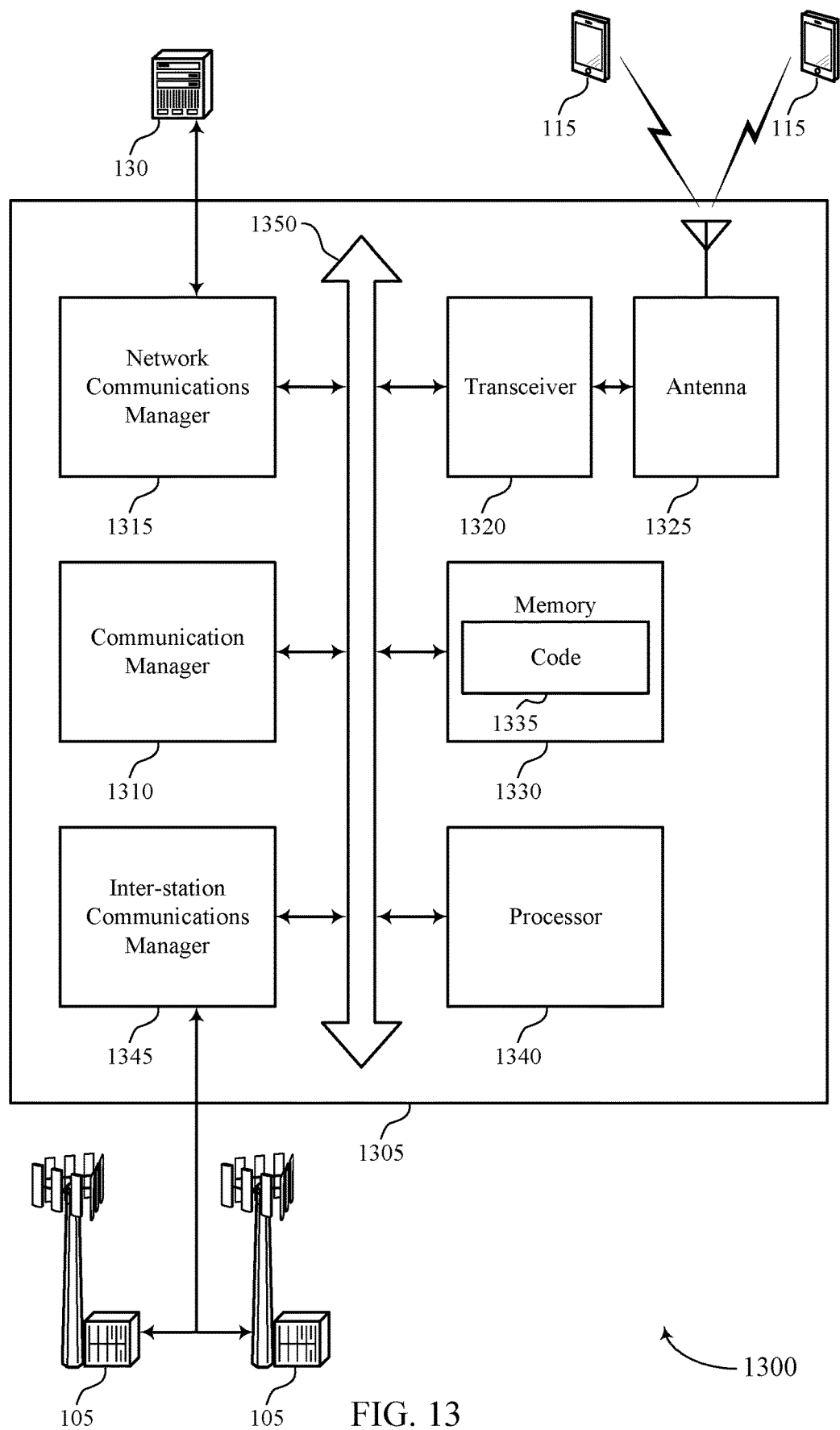
FIG. 13 shows a diagram of a system including a device that supports indication of listen-before-talk configuration for uplink communications in accordance with aspects of the present disclosure.

FIG. 13 shows a diagram of a system 1300 including a device 1305 that supports indication of listen-before-talk configuration for uplink communications in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communication manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communication manager 1310 may transmit, to a UE, a transmission over at least one of a set of periodically scheduled resources for the UE of a downlink shared channel in an unlicensed spectrum, where the transmission indicates a channel access configuration for the UE for the unlicensed spectrum and receive a message based on the indicated channel access configuration.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting indication of listen-before-talk configuration for uplink communications).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some aspects, the inter-station communications manager 1345 may provide an X2 interface within an LTE/LTE-A wireless communication network technology to provide communication between base stations 105.

Figure 14:
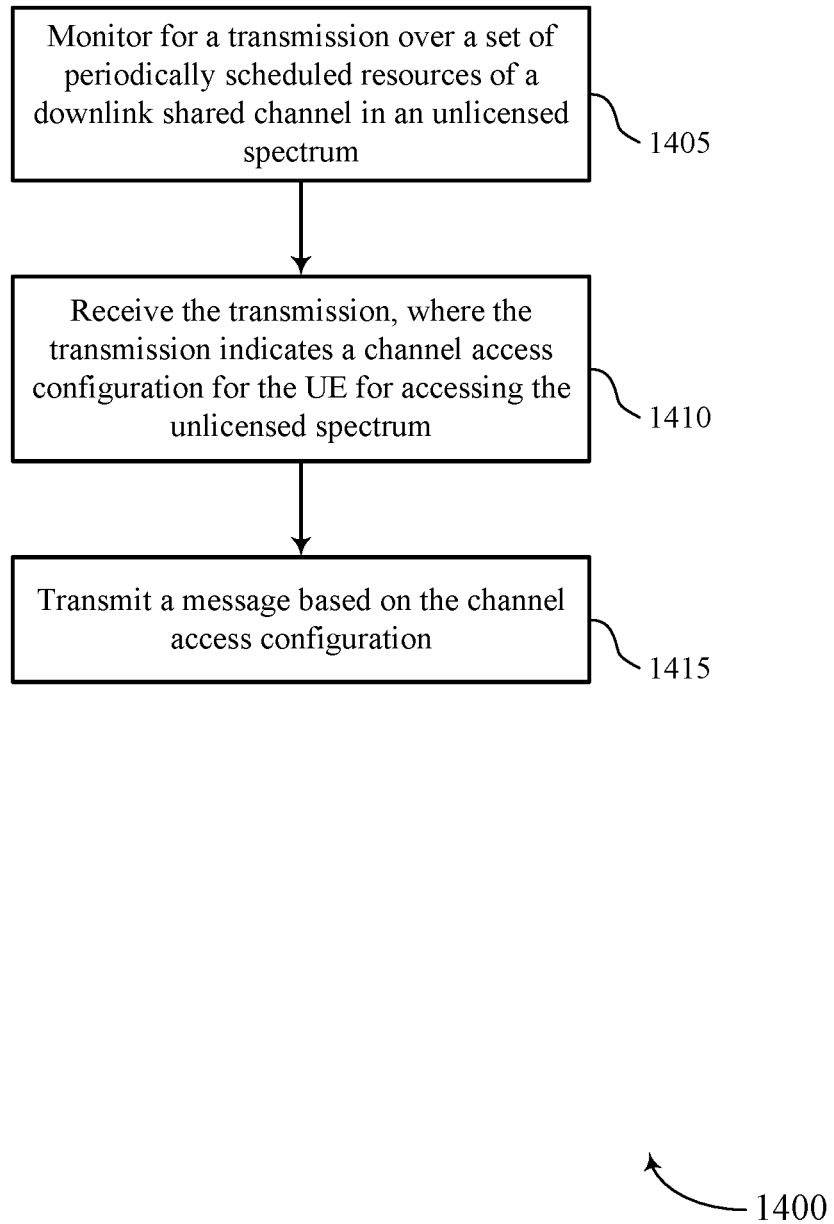
FIGS. 14 through 18 show flowcharts illustrating methods that support indication of listen-before-talk configuration for uplink communications in accordance with aspects of the present disclosure.

FIG. 14 shows a flowchart illustrating a method 1400 that supports indication of listen-before-talk configuration for uplink communications in accordance with aspects of the present disclosure. The operations of method 1400 may be implemented by a UE 115 or its components as described herein. For example, the operations of method 1400 may be performed by a communication manager as described with reference to FIGS. 6 through 9. In some aspects, a UE may execute a set of instructions to control the functional elements of the UE to perform the described functions. Additionally or alternatively, a UE may perform aspects of the described functions using special-purpose hardware.

At 1405, the UE may monitor for a transmission over a set of periodically scheduled resources of a downlink shared channel in an unlicensed spectrum. The operations of 1405 may be performed according to the methods described herein. In some aspects, aspects of the operations of 1405 may be performed by a transmission monitoring component as described with reference to FIGS. 6 through 9.

At 1410, the UE may receive the transmission, where the transmission indicates a channel access configuration for the UE for accessing the unlicensed spectrum. The operations of 1410 may be performed according to the methods described herein. In some aspects, aspects of the operations of 1410 may be performed by a transmission receiver as described with reference to FIGS. 6 through 9.

At 1415, the UE may transmit a message based on the channel access configuration. The operations of 1415 may be performed according to the methods described herein. In some aspects, aspects of the operations of 1415 may be performed by a message transmitter as described with reference to FIGS. 6 through 9.

Figure 15:
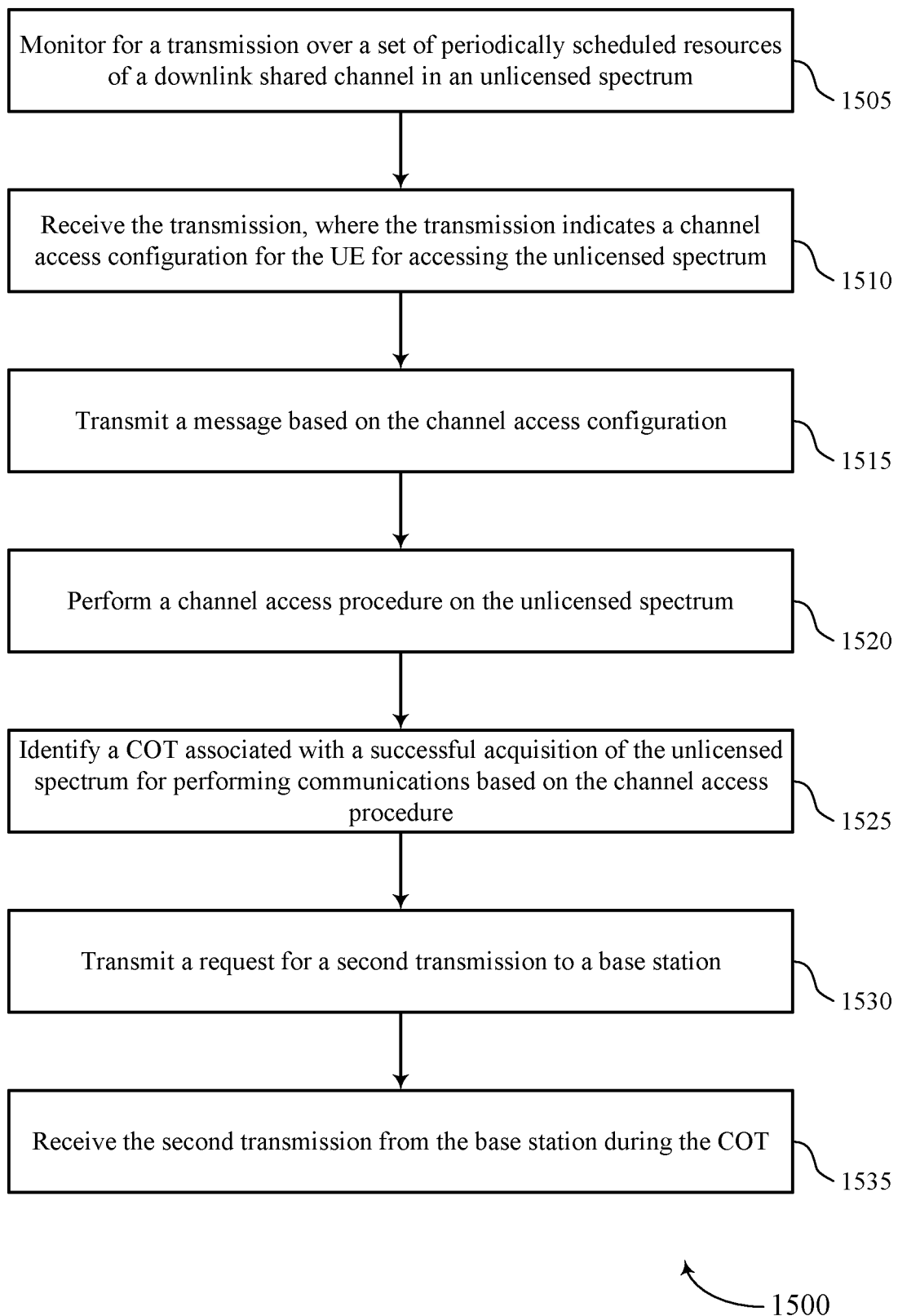

FIG. 15 shows a flowchart illustrating a method 1500 that supports indication of listen-before-talk configuration for uplink communications in accordance with aspects of the present disclosure. The operations of method 1500 may be implemented by a UE 115 or its components as described herein. For example, the operations of method 1500 may be performed by a communication manager as described with reference to FIGS. 6 through 9. In some aspects, a UE may execute a set of instructions to control the functional elements of the UE to perform the described functions. Additionally or alternatively, a UE may perform aspects of the described functions using special-purpose hardware.

At 1505, the UE may monitor for a transmission over a set of periodically scheduled resources of a downlink shared channel in an unlicensed spectrum. The operations of 1505 may be performed according to the methods described herein. In some aspects, aspects of the operations of 1505 may be performed by a transmission monitoring component as described with reference to FIGS. 6 through 9.

At 1510, the UE may receive the transmission, where the transmission indicates a channel access configuration for the UE for accessing the unlicensed spectrum. The operations of 1510 may be performed according to the methods described herein. In some aspects, aspects of the operations of 1510 may be performed by a transmission receiver as described with reference to FIGS. 6 through 9.

At 1515, the UE may transmit a message based on the channel access configuration. The operations of 1515 may be performed according to the methods described herein. In some aspects, aspects of the operations of 1515 may be performed by a message transmitter as described with reference to FIGS. 6 through 9.

At 1520, the UE may perform a channel access procedure on the unlicensed spectrum. The operations of 1520 may be performed according to the methods described herein. In some aspects, aspects of the operations of 1520 may be performed by a channel access procedure component as described with reference to FIGS. 6 through 9.

At 1525, the UE may identify a COT associated with a successful acquisition of the unlicensed spectrum for performing communications based on the channel access procedure. The operations of 1525 may be performed according to the methods described herein. In some aspects, aspects of the operations of 1525 may be performed by a channel access procedure component as described with reference to FIGS. 6 through 9.

At 1530, the UE may transmit a request for a second transmission to a base station. The operations of 1530 may be performed according to the methods described herein. In some aspects, aspects of the operations of 1530 may be performed by a request transmitter as described with reference to FIGS. 6 through 9.

At 1535, the UE may receive the second transmission from the base station during the COT. The operations of 1535 may be performed according to the methods described herein. In some aspects, aspects of the operations of 1535 may be performed by a transmission receiver as described with reference to FIGS. 6 through 9.

Figure 16:
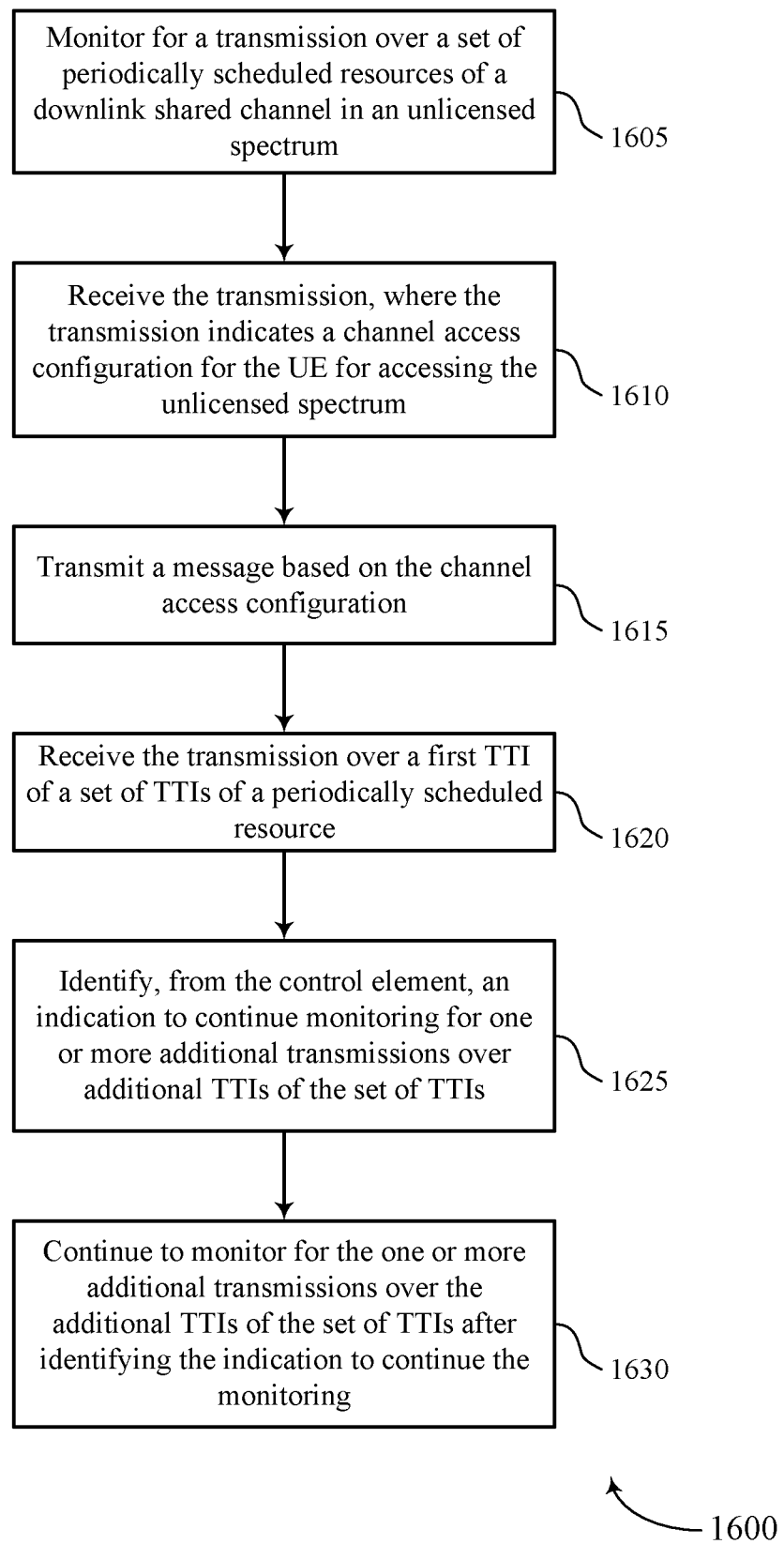

FIG. 16 shows a flowchart illustrating a method 1600 that supports indication of listen-before-talk configuration for uplink communications in accordance with aspects of the present disclosure. The operations of method 1600 may be implemented by a UE 115 or its components as described herein. For example, the operations of method 1600 may be performed by a communication manager as described with reference to FIGS. 6 through 9. In some aspects, a UE may execute a set of instructions to control the functional elements of the UE to perform the described functions. Additionally or alternatively, a UE may perform aspects of the described functions using special-purpose hardware.

At 1605, the UE may monitor for a transmission over a set of periodically scheduled resources of a downlink shared channel in an unlicensed spectrum. The operations of 1605 may be performed according to the methods described herein. In some aspects, aspects of the operations of 1605 may be performed by a transmission monitoring component as described with reference to FIGS. 6 through 9.

At 1610, the UE may receive the transmission, where the transmission indicates a channel access configuration for the UE for accessing the unlicensed spectrum. The operations of 1610 may be performed according to the methods described herein. In some aspects, aspects of the operations of 1610 may be performed by a transmission receiver as described with reference to FIGS. 6 through 9.

At 1615, the UE may transmit a message based on the channel access configuration. The operations of 1615 may be performed according to the methods described herein. In some aspects, aspects of the operations of 1615 may be performed by a message transmitter as described with reference to FIGS. 6 through 9.

At 1620, the UE may receive the transmission over a first TTI of a set of TTIs of a periodically scheduled resource. The operations of 1620 may be performed according to the methods described herein. In some aspects, aspects of the operations of 1620 may be performed by a transmission receiver as described with reference to FIGS. 6 through 9.

At 1625, the UE may identify, from the control element, an indication to continue monitoring for one or more additional transmissions over additional TTIs of the set of TTIs. The operations of 1625 may be performed according to the methods described herein. In some aspects, aspects of the operations of 1625 may be performed by a transmission monitoring component as described with reference to FIGS. 6 through 9.

At 1630, the UE may continue to monitor for the one or more additional transmissions over the additional TTIs of the set of TTIs after identifying the indication to continue the monitoring. The operations of 1630 may be performed according to the methods described herein. In some aspects, aspects of the operations of 1630 may be performed by a transmission monitoring component as described with reference to FIGS. 6 through 9.

Figure 17:
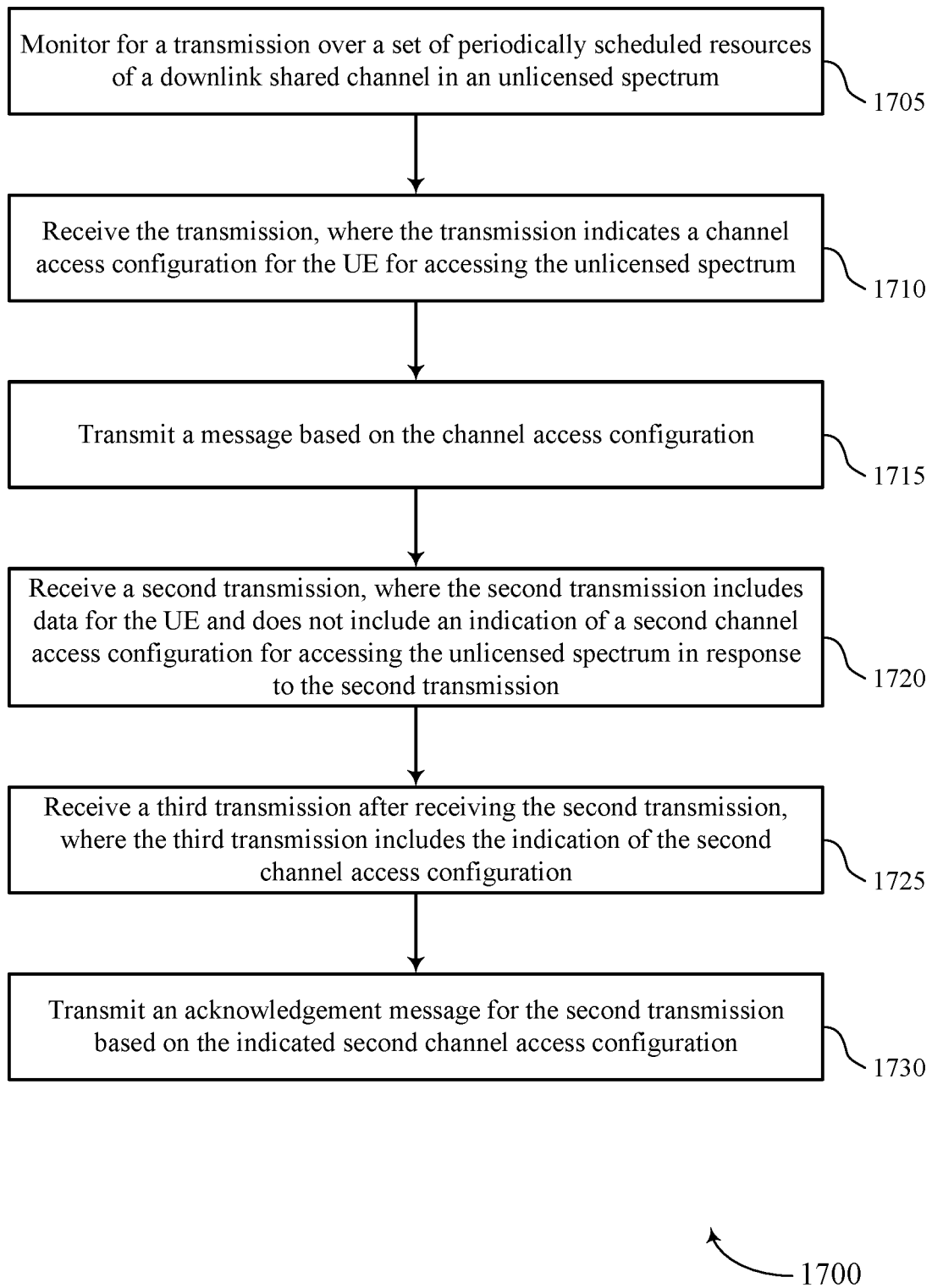

FIG. 17 shows a flowchart illustrating a method 1700 that supports indication of listen-before-talk configuration for uplink communications in accordance with aspects of the present disclosure. The operations of method 1700 may be implemented by a UE 115 or its components as described herein. For example, the operations of method 1700 may be performed by a communication manager as described with reference to FIGS. 6 through 9. In some aspects, a UE may execute a set of instructions to control the functional elements of the UE to perform the described functions. Additionally or alternatively, a UE may perform aspects of the described functions using special-purpose hardware.

At 1705, the UE may monitor for a transmission over a set of periodically scheduled resources of a downlink shared channel in an unlicensed spectrum. The operations of 1705 may be performed according to the methods described herein. In some aspects, aspects of the operations of 1705 may be performed by a transmission monitoring component as described with reference to FIGS. 6 through 9.

At 1710, the UE may receive the transmission, where the transmission indicates a channel access configuration for the UE for accessing the unlicensed spectrum. The operations of 1710 may be performed according to the methods described herein. In some aspects, aspects of the operations of 1710 may be performed by a transmission receiver as described with reference to FIGS. 6 through 9.

At 1715, the UE may transmit a message based on the channel access configuration. The operations of 1715 may be performed according to the methods described herein. In some aspects, aspects of the operations of 1715 may be performed by a message transmitter as described with reference to FIGS. 6 through 9.

At 1720, the UE may receive a second transmission, where the second transmission includes data for the UE and does not include an indication of a second channel access configuration for accessing the unlicensed spectrum in response to the second transmission. The operations of 1720 may be performed according to the methods described herein. In some aspects, aspects of the operations of 1720 may be performed by a transmission receiver as described with reference to FIGS. 6 through 9.

At 1725, the UE may receive a third transmission after receiving the second transmission, where the third transmission includes the indication of the second channel access configuration. The operations of 1725 may be performed according to the methods described herein. In some aspects, aspects of the operations of 1725 may be performed by a transmission receiver as described with reference to FIGS. 6 through 9.

At 1730, the UE may transmit an acknowledgement message for the second transmission based on the indicated second channel access configuration. The operations of 1730 may be performed according to the methods described herein. In some aspects, aspects of the operations of 1730 may be performed by a message transmitter as described with reference to FIGS. 6 through 9.

Figure 18:
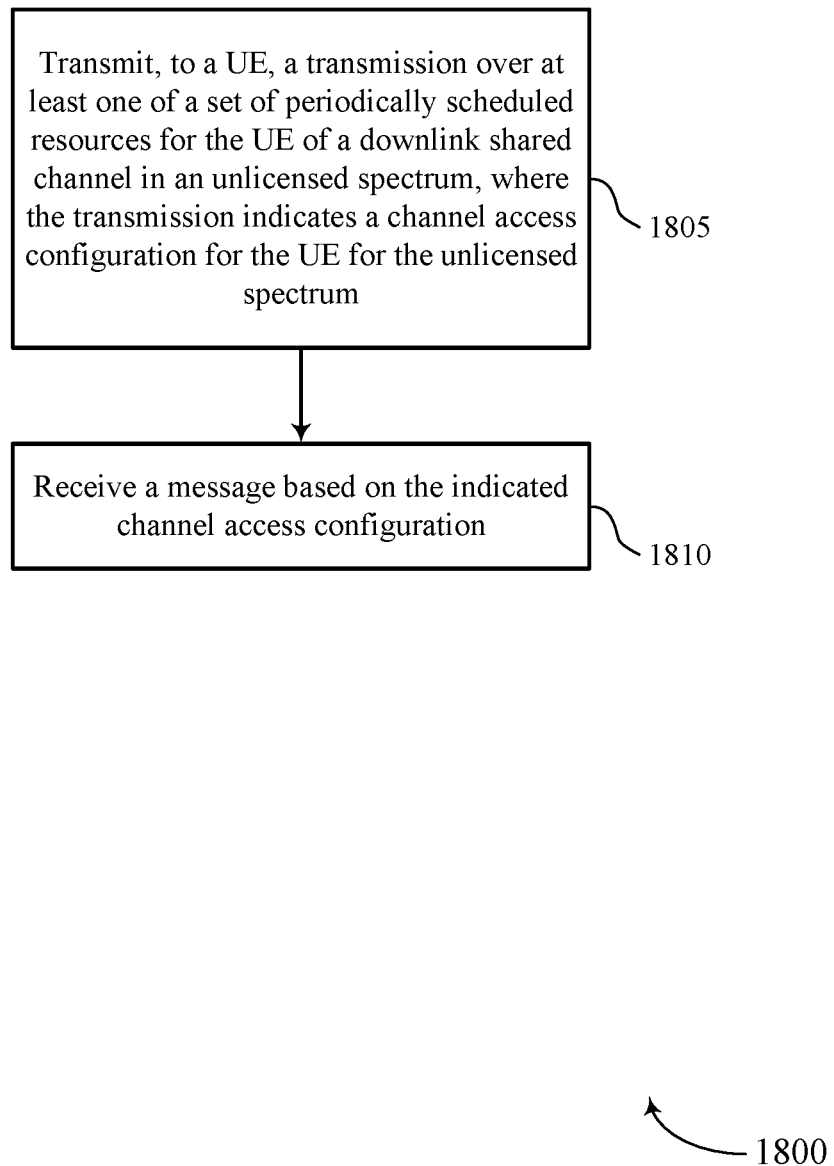

FIG. 18 shows a flowchart illustrating a method 1800 that supports indication of listen-before-talk configuration for uplink communications in accordance with aspects of the present disclosure. The operations of method 1800 may be implemented by a base station 105 or its components as described herein. For example, the operations of method 1800 may be performed by a communication manager as described with reference to FIGS. 10 through 13. In some aspects, a base station may execute a set of instructions to control the functional elements of the base station to perform the described functions. Additionally or alternatively, a base station may perform aspects of the described functions using special-purpose hardware.

At 1805, the base station may transmit, to a UE, a transmission over at least one of a set of periodically scheduled resources for the UE of a downlink shared channel in an unlicensed spectrum, where the transmission indicates a channel access configuration for the UE for the unlicensed spectrum. The operations of 1805 may be performed according to the methods described herein. In some aspects, aspects of the operations of 1805 may be performed by a transmission transmitter as described with reference to FIGS. 10 through 13.

At 1810, the base station may receive a message based on the indicated channel access configuration. The operations of 1810 may be performed according to the methods described herein. In some aspects, aspects of the operations of 1810 may be performed by a message receiver as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication implemented by a user equipment (UE), comprising:
   monitoring for a transmission over a set of periodically scheduled resources of a downlink shared channel in an unlicensed spectrum;
   receiving the transmission via at least a portion of the set of periodically scheduled resources of the downlink shared channel, wherein the transmission indicates a configuration for performing a second listen-before-talk (LBT) procedure at the UE for accessing the unlicensed spectrum within a channel occupancy time (COT) associated with the transmission, and wherein the COT is based at least in part on a first LBT procedure; and
   transmitting, during the COT, a message based at least in part on the configuration for performing the second LBT procedure.

2. The method of claim 1, wherein the transmission comprises a control element that indicates the configuration for performing the second LBT procedure.

3. The method of claim 2, wherein the message comprises an acknowledgement message associated with the transmission.

4. The method of claim 3, wherein the control element indicates at least one uplink channel for transmitting the acknowledgement message.

5. The method of claim 3, wherein the transmission further comprises data for the UE.

6. The method of claim 3, wherein each of the set of periodically scheduled resources comprises a plurality of transmission time intervals (TTIs), the method further comprising:
   receiving the transmission over a first TTI of a plurality of TTIs of a periodically scheduled resource;
   identifying, from the control element, an indication to continue monitoring for one or more additional transmissions over additional TTIs of the plurality of TTIs; and
   continuing to monitor for the one or more additional transmissions over the additional TTIs of the plurality of TTIs after identifying the indication to continue the monitoring.

7. The method of claim 2, wherein the control element indicates the COT associated with the transmission, the method further comprising transmitting the message based at least in part on the indicated COT.

8. The method of claim 2, wherein the control element comprises a medium access control (MAC) control element.

9. A method for wireless communication implemented by a network device, comprising:
   transmitting, to a user equipment (UE), a transmission via at least a portion of a set of periodically scheduled resources for the UE of a downlink shared channel in an unlicensed spectrum, wherein the transmission indicates a configuration for performing a second listen-before-talk (LBT) procedure at the UE for accessing the unlicensed spectrum within a channel occupancy time (COT) associated with the transmission, and wherein the COT is based at least in part on a first LBT procedure; and
   receiving a message based at least in part on the indicated configuration for performing the second LBT procedure.

10. The method of claim 9, wherein the transmission comprises a control element that indicates the configuration for performing the second LBT procedure.

11. The method of claim 10, wherein the message comprises an acknowledgement message.

12. The method of claim 11, wherein the control element indicates at least one uplink channel for transmitting the acknowledgement message.

13. The method of claim 11, further comprising:
   transmitting the transmission over a first transmission time interval (TTI) of a plurality of TTIs of a periodically scheduled resource of the set of periodically scheduled resources, wherein the control element comprises an indication to continue monitoring for one or more additional transmissions over additional TTIs of the plurality of TTIs; and transmitting the one or more additional transmissions over one or more of the additional TTIs of the plurality of TTIs.

14. The method of claim 10, wherein the control element comprises a medium access control (MAC) control element.

15. The method of claim 9, wherein the transmission further comprises data for the UE.

16. An apparatus for wireless communication at a user equipment (UE), comprising:
a processor,
memory coupled with the processor, and
instructions stored in the memory and executable by the processor to cause the apparatus to:
monitor for a transmission over a set of periodically scheduled resources of a downlink shared channel in an unlicensed spectrum;
receive the transmission via at least a portion of the set of periodically scheduled resources of the downlink shared channel, wherein the transmission indicates a configuration for performing a second listen-before-talk (LBT) procedure at the UE for accessing the unlicensed spectrum within a channel occupancy time (COT) associated with the transmission, and wherein the COT is based at least in part on a first LBT procedure; and
transmit a message based at least in part on the configuration for performing the second LBT procedure.

17. The apparatus of claim 16, wherein the transmission comprises a control element that indicates the configuration for performing the second LBT procedure.

18. The apparatus of claim 17, wherein the message comprises an acknowledgement message associated with the transmission.

19. The apparatus of claim 18, wherein the control element indicates at least one uplink channel for transmitting the acknowledgement message.

20. The apparatus of claim 18, wherein the transmission further comprises data for the UE.

21. The apparatus of claim 18, wherein each of the set of periodically scheduled resources comprises a plurality of transmission time intervals (TTIs), and the instructions are further executable by the processor to cause the apparatus to:
receive the transmission over a first TTI of a plurality of TTIs of a periodically scheduled resource;
identify, from the control element, an indication to continue monitoring for one or more additional transmissions over additional TTIs of the plurality of TTIs; and
continue to monitor for the one or more additional transmissions over the additional TTIs of the plurality of TTIs after identifying the indication to continue the monitoring.

22. The apparatus of claim 17, wherein the control element indicates the COT associated with the transmission, the instructions further executable by the processor to cause the apparatus to transmit the message based at least in part on the indicated COT.

23. The apparatus of claim 17, wherein the control element comprises a medium access control (MAC) control element.

24. An apparatus for wireless communication at a network device base station, comprising:
a processor,
memory coupled with the processor, and
instructions stored in the memory and executable by the processor to cause the apparatus to:
transmit, to a user equipment (UE), a transmission via at least a portion of a set of periodically scheduled resources for the UE of a downlink shared channel in an unlicensed spectrum, wherein the transmission indicates a configuration for performing a second listen-before-talk (LBT) procedure at the UE for the unlicensed spectrum within a channel occupancy time (COT) associated with the transmission, and wherein the COT is based at least in part on a first LBT procedure; and
receive a message based at least in part on the indicated configuration for performing the second LBT procedure.

25. The apparatus of claim 24, wherein the transmission comprises a control element that indicates the configuration for performing the second LBT procedure.

26. The apparatus of claim 25, wherein the message comprises an acknowledgement message.

27. The apparatus of claim 26, wherein the control element indicates at least one uplink channel for transmitting the acknowledgement message.

28. The apparatus of claim 26, wherein the instructions are further executable by the processor to cause the apparatus to:
transmit the transmission over a first transmission time interval (TTI) of a plurality of TTIs of a periodically scheduled resource of the set of periodically scheduled resources, wherein the control element comprises an indication to continue monitoring for one or more additional transmissions over additional TTIs of the plurality of TTIs; and
transmit the one or more additional transmissions over one or more of the additional TTIs of the plurality of TTIs.

29. The apparatus of claim 25, wherein the control element comprises a medium access control (MAC) control element.

30. The apparatus of claim 24, wherein the transmission further comprises data for the UE.

* * * * *